(12) United States Patent
Xu

(10) Patent No.: US 11,336,906 B2
(45) Date of Patent: May 17, 2022

(54) IMAGE PROCESSING METHOD AND DEVICE FOR IMAGE, DATA TRANSMISSION METHOD AND DEVICE, AND STORAGE MEDIUM COMPRESSION BY COMBINING RECTANGULAR REGIONS OF BINARIZED IMAGES

(71) Applicant: BOE TECHNOLOGY GROUP CO., LTD., Beijing (CN)

(72) Inventor: Lingfeng Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/765,643

(22) PCT Filed: Apr. 17, 2019

(86) PCT No.: PCT/CN2019/083095
§ 371 (c)(1),
(2) Date: May 20, 2020

(87) PCT Pub. No.: WO2020/211021
PCT Pub. Date: Oct. 22, 2020

(65) Prior Publication Data
US 2021/0235098 A1 Jul. 29, 2021

(51) Int. Cl.
*H04N 19/186* (2014.01)
*H04N 19/129* (2014.01)
(Continued)

(52) U.S. Cl.
CPC ............. *H04N 19/186* (2014.11); *G06T 7/11* (2017.01); *H04N 19/129* (2014.11);
(Continued)

(58) Field of Classification Search
CPC ......... G06T 7/11; G06T 7/187; G06T 19/006; G06T 2207/30204; G06T 7/70;
(Continued)

(56) References Cited

U.S. PATENT DOCUMENTS 5,896,176 A 4/1999 Das et al.
10,410,356 B2 * 9/2019 Zhang .................... G06T 7/187
(Continued)

FOREIGN PATENT DOCUMENTS

CN 101742327 6/2010
CN 102724503 10/2012
(Continued)

*Primary Examiner* — Alison Slater
(74) *Attorney, Agent, or Firm* — Leason Ellis LLP

(57) ABSTRACT

An image processing method for an image, a data transmission method, an image processing device for an image, a data transmission device, and a storage medium are disclosed. The image is a binarized image, and the binarized image includes a plurality of pixels, among the plurality of pixels, pixels having a first value are first pixels, and pixels having a second value are second pixels, and the image processing method includes: dividing the image to determine N rectangular regions, which include only the first pixels, of the image; and obtaining start coordinates and end coordinates of the N rectangular regions, respectively, thereby obtaining compressed data after compressing the image. N is an integer greater than or equal to 1. The image processing method can improve the compression rate of the image.

16 Claims, 9 Drawing Sheets

(51) Int. Cl.
*H04N 19/176* (2014.01)
*H04N 19/182* (2014.01)
*G06T 7/11* (2017.01)
*G06T 7/187* (2017.01)
*G06F 17/00* (2019.01)

(52) U.S. Cl.
CPC ......... *H04N 19/176* (2014.11); *H04N 19/182* (2014.11); *G06F 17/00* (2013.01); *G06T 7/187* (2017.01)

(58) Field of Classification Search
CPC .. G06T 1/00; G06T 1/60; G06T 15/20; G06T 2200/04; G06T 2200/28; G06T 2207/20021; G06T 2215/16; G06T 7/001; G06T 7/30; G06T 7/73; G06T 7/80; G06T 2207/30196; G06T 7/60; G06T 2207/10016; G06T 2207/10061; G06T 2207/10072; G06T 2207/10101; G06T 2207/30041; G06T 2207/30148; G06T 3/0093; G06T 5/006; G06T 7/0004; G06T 7/0012; G06T 1/20; G06T 11/60; G06T 2207/10008; G06T 2207/20192; G06T 2207/30168; G06T 2207/30176; G06T 2207/30232; G06T 3/403; G06T 5/003; G06T 5/10; G06T 7/0002; G06T 7/12; G02B 2027/0138; G02B 2027/014; G02B 27/0172; G02B 2027/0154; G02B 2027/0178; G02B 27/0101; G02B 27/017; G02B 27/0176; H04N 19/176; H04N 19/13; H04N 19/70; H04N 19/61; H04N 19/18; H04N 19/91; H04N 19/139; H04N 19/44; H04N 19/593; H04N 19/156; H04N 19/184; H04N 19/122; H04N 19/129; H04N 19/136; H04N 19/182; H04N 19/42; H04N 19/523; H04N 19/625; H04N 1/3873; H04N 13/293; H04N 19/105; H04N 19/117; H04N 19/124; H04N 19/154; H04N 19/157; H04N 19/159; H04N 1/4052; H04N 19/12; H04N 19/186; H04N 19/513; H04N 19/52; H04N 19/82; H04N 1/047; H04N 1/1135; H04N 1/12; H04N 1/3875; H04N 1/3876; H04N 1/3878; H04N 1/393; H04N 1/40062; H04N 19/103; H04N 19/109; H04N 19/137; H04N 19/146; H04N 19/577; H04N 19/60; H04N 2201/0471; H04N 2201/04717; H04N 2201/04722; H04N 2201/04787; H04N 5/2256; H04N 7/18; H04N 1/00236; H04N 1/00238; H04N 1/33323; H04N 1/33392; H04N 1/4072; H04N 1/411; H04N 17/002; H04N 19/119; H04N 19/14; H04N 19/172; H04N 19/174; H04N 19/463; H04N 19/51; H04N 19/85; H04N 19/96; H04N 2201/33321; H04N 2201/33328; H04N 2201/33357; H04N 2201/33378; G06F 3/011; G06F 1/163; G06F 1/1686; G06F 3/012; G06F 3/013; G06F 3/0304; G06F 3/147; G06F 17/00; B41J 11/0095; B41J 11/42; B41J 13/26; B41J 13/32; B41J 15/046; B41J 2/2132; B41J 29/393
See application file for complete search history.

(56) References Cited

U.S. PATENT DOCUMENTS

2015/0086112 A1* 3/2015 Tian .................. G06K 9/34
382/173
2018/0189952 A1* 7/2018 Zhang ................. G06F 30/39

FOREIGN PATENT DOCUMENTS

| CN | 104735449 | | 6/2015 |
| CN | 106874543 | | 6/2017 |
| JP | 10108011 | | 4/1998 |
| JP | 2004140749 | | 5/2004 |
| JP | 2004140749 | A * | 5/2004 |

* cited by examiner

IMAGE PROCESSING METHOD AND DEVICE FOR IMAGE, DATA TRANSMISSION METHOD AND DEVICE, AND STORAGE MEDIUM COMPRESSION BY COMBINING RECTANGULAR REGIONS OF BINARIZED IMAGES

CROSS-REFERENCE TO RELATED PATENT APPLICATIONS

This application is a U.S. National Stage Application under 35 U.S.C. § 371 of International Patent Application No. PCT/CN2019/083095, filed Apr. 17, 2019, which is incorporated by reference in its entirety.

TECHNICAL FIELD

The embodiments of the present disclosure relate to an image processing method for an image, a data transmission method, an image processing device for an image, a data transmission device, and a storage medium.

BACKGROUND

Image compression refers to a technique of representing a pixel matrix of an original image with fewer bits in a lossy or lossless manner, and is also known as image coding. From a mathematical point of view, actually, this process is to transform a two-dimensional pixel array into a statistically unrelated data set.

Data transmission is a process of transmitting data between a data source and a data sink through one or more links in accordance with appropriate procedures. For example, the image data after being compressed by the above-mentioned image compression can be transmitted. Data transmission is divided into parallel transmission, serial transmission, asynchronous transmission, synchronous transmission, simplex transmission, etc.

SUMMARY

At least one embodiment of the present disclosure provides an image processing method for an image, the image is a binarized image, and the binarized image comprises a plurality of pixels, among the plurality of pixels, pixels having a first value are first pixels, and pixels having a second value are second pixels, and the image processing method comprises: dividing the image to determine N rectangular regions, which comprise only the first pixels, of the image; and obtaining start coordinates and end coordinates of the N rectangular regions, respectively, thereby obtaining compressed data after compressing the image; N is an integer greater than or equal to one.

For example, in the image processing method provided by at least one embodiment of the present disclosure, the first pixels comprise third pixels, and the third pixels are first pixels in an undetermined rectangular region; dividing the image to determine the N rectangular regions, which comprise only the first pixels, of the image, comprises: in a process of dividing the image, a rectangular region determined each time being a largest rectangular region comprising the third pixels.

For example, in the image processing method provided by at least one embodiment of the present disclosure, the first pixels further comprise fourth pixels, and the fourth pixels are first pixels in a determined rectangular region; dividing the image to determine an n-th rectangular region of the N rectangular regions, which comprise only the first pixels, of the image, comprises: searching for the third pixels in the image; performing a first scan along a first scan direction starting from a third pixel that is first searched until reaching a second pixel, the fourth pixel, or a boundary of the image, thereby obtaining an intermediate block region; and based on the intermediate block region, performing a second scan along a second scan direction that is different from the first scan direction to expand the intermediate block region until reaching the second pixel, the fourth pixel or the boundary of the image, so as to obtain the n-th rectangular region of the image; n is an integer greater than or equal to one and less than or equal to N.

For example, in the image processing method provided by at least one embodiment of the present disclosure, the first scan direction is one selected from a group consisting of a row direction and a column direction of a pixel array, and correspondingly, the second scan direction is other one selected from the group consisting of the row direction and the column direction of the pixel array.

For example, in the image processing method provided by at least one embodiment of the present disclosure, a scan region generated through the first scan is a square region with the third pixel that is first searched as a vertex, and the first scan direction is a diagonal direction starting from the third pixel that is first searched in the square region, and the second scan direction is the row direction or the column direction of the pixel array.

For example, in the image processing method provided by at least one embodiment of the present disclosure, the square region is expanded until either side of the square region reaches the second pixel, the fourth pixel, or the boundary of the image to determine the intermediate block region.

For example, in the image processing method provided by at least one embodiment of the present disclosure, the second scan is a point scan method or a line-segment scan method.

For example, the image processing method provided by at least one embodiment of the present disclosure further comprises: performing the first scan along the first scan direction starting from the third pixel that is first searched, in a case of reaching the second pixel and/or the fourth pixel, determining a direction judgment region, the direction judgment region being a scan region obtained by expanding the intermediate block region along the diagonal direction by one pixel row and one pixel column; judging whether an amount of second pixels and/or fourth pixels on the one pixel row, which is expanded, of the direction judgment region is greater than, less than, or equal to an amount of second pixels and/or fourth pixels on the one pixel column, which is expanded, of the direction judgment region, if the amount of second pixels and/or fourth pixels on the one pixel row, which is expanded, of the direction judgment region is greater than the amount of second pixels and/or fourth pixels on the one pixel column, which is expanded, of the direction judgment region, determining that the second scan direction is the row direction; if the amount of second pixels and/or fourth pixels on the one pixel row, which is expanded, of the direction judgment region is less than the amount of second pixels and/or fourth pixels on the one pixel column, which is expanded, of the direction judgment region, determining that the second scan direction is the column direction; and if the amount of second pixels and/or fourth pixels on the one pixel row, which is expanded, of the direction judgment region is equal to the amount of second pixels and/or fourth pixels on the one pixel column, which is expanded, of the direction judgment region, determining that the second scan direction is the row direction or the column direction or stopping scanning.

For example, the image processing method provided by at least one embodiment of the present disclosure further comprises: after determining the n-th rectangular region, scanning the image row by row or column by column starting from an origin of the binarized image or a starting first pixel of the n-th rectangular region to determine a next third pixel, thereby determining an (n+1)-th rectangular region among the N rectangular regions.

At least one embodiment of the present disclosure further provides a data transmission method, comprising: determining the N rectangular regions of the image and the start coordinates and the end coordinates of the N rectangular regions according to the image processing method according to any one of the embodiments of the present disclosure; and framing and transmitting the start coordinates and the end coordinates of the N rectangular regions; N is an integer greater than or equal to one.

For example, in the data transmission method provided by at least one embodiment of the present disclosure, framing and transmitting the start coordinates and the end coordinates of the N rectangular regions comprises: obtaining types of the N rectangular regions, respectively; and according to the types of the N rectangular regions, framing and transmitting the start coordinates and the end coordinates of rectangular regions of respective types, respectively.

For example, in the data transmission method provided by at least one embodiment of the present disclosure, the types of the N rectangular regions comprise a single-point block format, a strip-type format with a width of one pixel, a square matrix format, and a strip-type format with a width of k pixels; k is an integer greater than one.

For example, in the data transmission method provided by at least one embodiment of the present disclosure, the end coordinates represent a scan direction and a length; the length is a difference between a start coordinate and an end coordinate in the row direction and/or column direction.

For example, in the data transmission method provided by at least one embodiment of the present disclosure, framing and transmitting the start coordinates and the end coordinates of the N rectangular regions comprises: compressing the start coordinates and the end coordinates into bytes and transmitting the bytes.

For example, the data transmission method provided by at least one embodiment of the present disclosure further comprises: receiving a color image; performing grayscale processing on the color image to obtain a grayscale image and performing binarization processing on the grayscale image to obtain the binarized image.

For example, the data transmission method provided by at least one embodiment of the present disclosure further comprises: by a receiving terminal, receiving the start coordinates and the end coordinates, which are framed and transmitted, of the N rectangular regions of the image, and decompressing the start coordinates and the end coordinates, which are framed, transmitted, and received, of the N rectangular regions of the image, to restore to the image before division.

At least one embodiment of the present disclosure further provides an image processing device for an image, the image being a binarized image, and the binarized image comprising a plurality of pixels, among the plurality of pixels, pixels having a first value are first pixels, and pixels having a second value are second pixels, and the image processing device comprises: a division unit, configured to divide the image to determine N rectangular regions, which comprise only the first pixels, of the image; and a compression unit, configured to obtain start coordinates and end coordinates of the N rectangular regions, respectively, thereby obtaining compressed data after compressing the image; N is an integer greater than or equal to one.

At least one embodiment of the present disclosure further provides an image processing device for an image, comprising: a processor; a memory, storing one or more computer program modules. The one or more computer program modules are configured to be executed by the processor, and the one or more computer program modules comprise instructions for performing the image processing method according to any one of the embodiments of the present disclosure.

At least one embodiment of the present disclosure further provides a data transmission device, comprising the image processing device according to any one of the embodiments of the present disclosure and a transmission unit; the transmission unit is configured to frame and transmit the start coordinates and the end coordinates of the N rectangular regions.

At least one embodiment of the present disclosure further provides a storage medium, non-temporarily storing computer-readable instructions, in a case where the computer-readable instructions stored non-temporarily are executed by a computer, the computer executes instructions for the image processing method according to any one of the embodiments of the present disclosure or instructions for the data transmission method according to any one of the embodiments of the present disclosure.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1A:
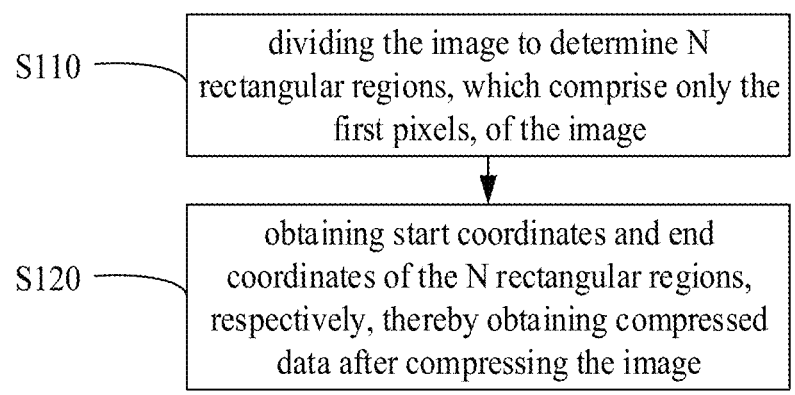
FIG. 1A is a flowchart of an image processing method provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The present disclosure is described below through some specific embodiments. In order to keep the following descriptions of the embodiments of the present disclosure clear and concise, detailed descriptions of known functions and known components may be omitted. In the case where any component of an embodiment of the present disclosure appears in more than one drawing, the component is indicated by the same or similar reference numeral in each drawing.

At present, an electronic ink screen mainly displays text, numbers, or letters. The display technology of the electronic ink screen mainly includes the following two types:

1. Adding a font-library module to a drive circuit, and extracting a font to be displayed from the font-library module; and 2. Presetting the fonts to be displayed in a driver, and extracting and displaying the fonts when necessary.

For example, taking a font represented in hexadecimal as an example, 0 can be represented as 11111100, that is, a value of the font is 0xFC, and 7 can be represented as 11100000, that is, the value of the font is 0xE0.

As for the first display technology 1, a size of the text and an amount of the font types that can be stored in the drive circuit are limited. For electronic ink screens of different sizes, the font chip may need to be replaced in real time, thereby increasing application complexity and the hardware cost of the electronic ink screen.

For the second display technology 2, because the font to be displayed needs to be preset in the driver, the font to be displayed are only preset according to specific application scenarios, and cannot be applied to occasions where the application scenarios vary greatly.

In order to overcome the above technical problems, the electronic ink screen can display the contents, such as the text, numbers, letters, pictures, or the like, which need to be displayed, in a form of images, that is, the image data generated by the computer is directly transmitted to the electronic ink screen for display, therefore, it is possible to avoid displaying the corresponding text content in a manner of storing the font.

However, in the case where the electronic ink screen displays in the form of images, a large amount of image data needs to be transmitted. For example, in an example, the image transmission process of the electronic ink screen includes performing grayscale processing on an original image, then performing binarization processing to obtain a binarized image, and then framing and transmitting the binarized image in such a manner that each pixel included in the binarized image occupies 1 bit. For example, for an image with a resolution of 512×512, the image includes a total of 262144 pixels, the amount of transmitted data is 32768 bytes (1 byte=8 bit). However, in the case where such huge transmission data is transmitted in low-speed wireless communication methods, such as NFC (Near Field Communication) and Lora (Long Rang), the time consumption is long, which seriously affects the display quality and is not conducive to product promotion and application. Therefore, the inventor noticed that how to compress the image to increase the data transmission rate is an urgent problem to be solved in the display field.

At least one embodiment of the present disclosure provides an image processing method for an image. The image is a binarized image, and the binarized image comprises a plurality of pixels, among the plurality of pixels, pixels having a first value are first pixels, and pixels having a second value are second pixels. The image processing method comprises: dividing the image to determine N rectangular regions, which comprise only the first pixels, of the image; and obtaining start coordinates and end coordinates of the N rectangular regions, respectively, thereby obtaining compressed data after compressing the image. N is an integer greater than or equal to 1

At least one embodiment of the present disclosure also provides a data transmission method, an image processing device for an image, a data transmission device, and a storage medium corresponding to the above-described image processing method.

The image processing method provided by the above embodiment of the present disclosure can divide the binarized image and use the divided binarized image for framing and transmission, for example, thereby improving the compression rate of the image, and reducing the amount of the transmission data in the case where the compressed data is used for data transmission, thus solving the problems, such as long time-consuming in the case where the NFC and other low-speed communication technologies are applied to the electronic ink screen, and reducing the power consumption of the electronic ink screen.

The embodiments and examples of the present disclosure will be described in detail below with reference to the drawings.

FIG. 1A is a flowchart of an image processing method provided by at least one embodiment of the present disclosure. For example, the image processing method can be applied to an electronic ink screen, etc. Of course, the image processing method can also be applied to other types of display devices (for example, a liquid crystal display device, an organic light-emitting display device, a quantum dot light-emitting display device, etc.), and the embodiments of the present disclosure are not limited thereto. The image processing method can be implemented in a form of software, and can be loaded and executed by a processor in a display panel, for example, loaded and executed by a central processing unit (CPU) in the electronic ink screen; or, the image processing method can be at least partially implemented in a form of software, hardware, firmware, or any combination thereof, the image processing method can increase the image compression rate, and when used for, for example, framing and transmission, the image processing method can reduce the amount of transmission data, solve the problems, such as long time-consuming in the case where the NFC and other low-speed communication technologies are applied to the electronic ink screen, and reduce the power consumption of the electronic ink screen.

Hereinafter, the image processing method provided by at least one embodiment of the present disclosure will be described with reference to FIG. 1A. As shown in FIG. 1A, the image processing method includes steps S110 to S120. Hereinafter, the steps S110 to S120 and their respective exemplary implementations of the image processing method are described respectively.

Step S110: dividing the image to determine N rectangular regions, which comprise only the first pixels, of the image.

Step S120: obtaining start coordinates and end coordinates of the N rectangular regions, respectively, thereby obtaining compressed data after compressing the image.

Here, N is an integer greater than or equal to one.

Figures 1B, 1C, 1D:
FIG. 1B is a schematic diagram of a grayscale image.
FIG. 1C is a schematic diagram of a binarized image obtained by performing binarization processing on the grayscale image as shown in FIG. 1B.
FIG. 1D is a schematic diagram of a divided image obtained by dividing the binarized image as shown in FIG. 1B.

For example, in the embodiments of the present disclosure, the image is a binarized image (as shown in FIG. 1C). For example, the binarized image is obtained by performing grayscale processing on a color image to obtain a grayscale image (as shown in FIG. 1B) and performing binarization processing on the grayscale image. For example, the grayscale processing and the binarization processing can be implemented by processing methods in the art, and will not be repeated here.

For example, the binarized image includes a plurality of pixels. For example, a pixel having a first value (e.g., one) among the plurality of pixels is a first pixel, and a pixel having a second value (e.g., zero) among the plurality of pixels is a second pixel. For example, in the examples as shown in FIGS. 2A-2C, the first pixel represents a pixel displayed as black, and the second pixel represents a pixel displayed as white.

For step S110, for example, as shown in FIG. 1D, the image obtained by dividing the binarized image as shown in FIG. 1C includes N rectangular regions including only the first pixels (for example, pixels displayed as black in FIG. 1C).

Figure 2A:
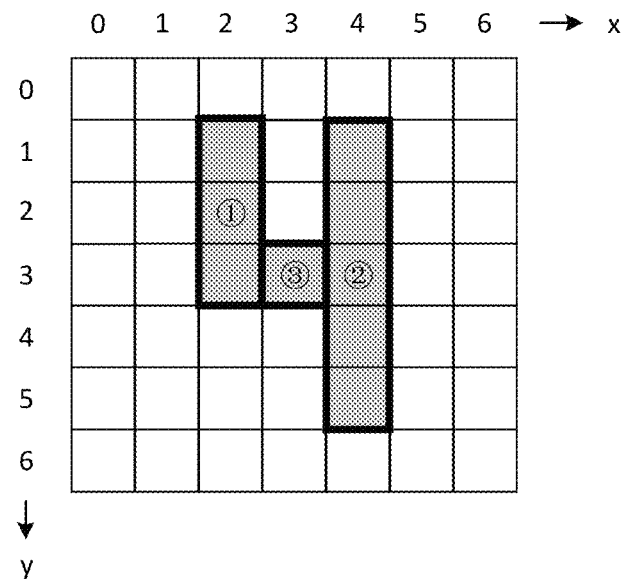
FIG. 2A is a schematic diagram of an example of a divided image provided by at least one embodiment of the present disclosure.
Figure 2B:
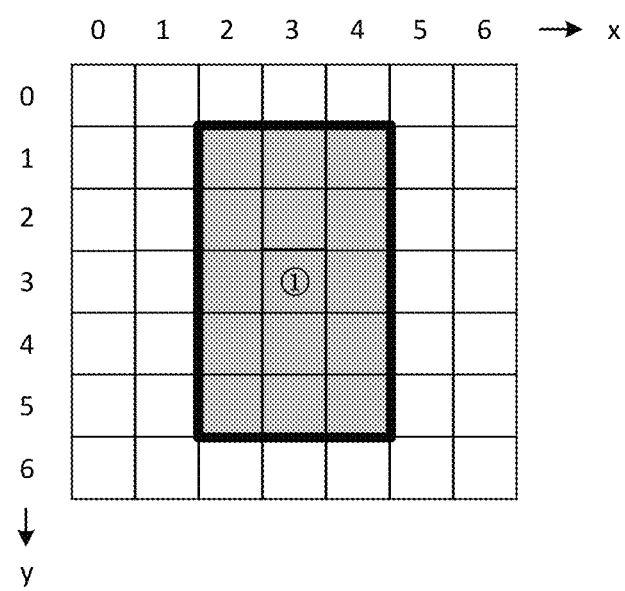
FIG. 2B is a schematic diagram of another example of a divided image provided by at least one embodiment of the present disclosure.
Figure 2C:
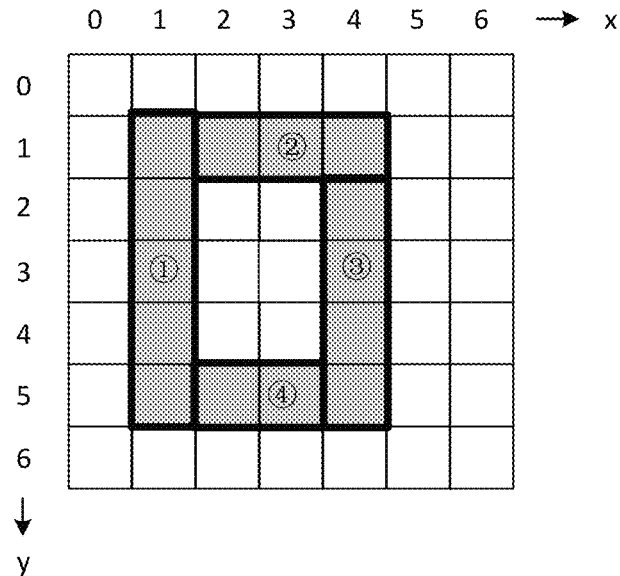
FIG. 2C is a schematic diagram of yet another example of a divided image provided by at least one embodiment of the present disclosure.

More specifically, for example, in the example as shown in FIG. 2A, in the case where a displayed image (for example, font) is the number 4, the number 4 can be divided into three rectangular regions (for example, a region ①, a region ②, and a region ③) including only the first pixels (for example, black blocks in FIG. 2A); for example, in the example shown in FIG. 2B, in the case where the displayed image is a square block, the square block is a rectangular region including only the first pixels (for example, black blocks in FIG. 2B), and therefore, after the square block is divided, only 1 rectangular region (for example, a rectangular area ①) is included; for example, in the example as shown in FIG. 2C, in the case where the displayed image is a hollow rectangular frame, the rectangular frame may be divided into four rectangular regions (for example, a region ①, a region ②, a region ③, and a region ④) including only the first pixels (for example, black blocks in FIG. 2C). It should be noted that the method of dividing the respective images in FIGS. 2A-2C is only exemplary, and may depend on specific circumstances, so a range and an amount of specifically divided rectangular regions are not limited thereto, and the embodiments of the present disclosure do not limit this case.

For example, in the examples as shown in FIGS. 2A-2C, for clarity and conciseness, taking a case that the resolution of the image is 7*7 as an example to be described, but the embodiments of the present disclosure are not limited thereto. For example, in the images as shown in FIGS. 2A-2C, a black block represents a pixel of the image, that is, a first pixel, and a white block represents a second pixel of the image. The following embodiments are the same as those described herein, and similar portions will not be repeated again.

For example, in ae process of dividing the image, the rectangular region determined each time is a largest rectangular region including the first pixels in an undetermined rectangular region. For example, for convenience and conciseness, the first pixels of the undetermined rectangular region are denoted as third pixels. The following embodiments are the same as those described herein and similar portions will not be described in detail. It should be noted that a size of the largest rectangular region may depend on specific situations, for example, the size of the largest rectangular region is related to the scan direction for the third pixels, and the embodiments of the present disclosure do not limit this case.

For example, some conventional dividing methods usually determine a plurality of relatively fine small regions, rather than dividing the relatively large region including the third pixels. Moreover, these small regions do not include all the first pixels, as long as these small regions can satisfy the requirements of the distortion that the human eye cannot perceive. For example, the smooth filtering, Huffman coding, and other operations can be performed on respective small regions after dividing the image to transmit the data of the respective small regions. Therefore, the conventional dividing methods and the conventional transmission methods require to transmit a large amount of data.

However, the rectangular regions divided by the image processing method in at least one embodiment of the present disclosure are all the largest rectangular regions including the third pixels. For example, the largest rectangular region refers to the largest rectangular region determined by taking a determined third pixel, that is first searched, as a starting point, and may not include all the first pixels (for example, not including the first pixel of the determined rectangular region), but includes all the third pixels (that is, the first pixels in the undetermined rectangular region), so that the respective rectangular regions can be maximized without overlapping each other, thereby further reducing the amount of data transmission, avoiding repeated data transmission during data transmission, and improving the compression rate of the image.

It should be noted that the specific exemplary dividing method is described in detail below, and will not be repeated here again.

For example, a division unit for determining the N rectangular regions, which comprises only the first pixels, of the image may be provided, and the image is divided by the division unit to determine the N rectangular regions, which comprises only the first pixels, of the image. For example, the division unit may be implemented by the central processing unit (CPU), an image processor (GPU), a tensor processor (TPU), a field programmable logic gate array (FPGA), or other forms of processing units with data processing capabilities and/or instruction execution capabilities and corresponding computer instructions. For example, the processing unit may be a general-purpose processor or a dedicated processor, and may be a processor based on X86 or ARM architecture and the like.

For step S120, after determining the N rectangular regions, which comprises only the first pixels, of the image based on step S110, the start coordinates and the end coordinates of the N rectangular regions may be acquired.

For example, a 7*7 pixel matrix as shown in FIGS. 2A-2C is constructed by taking a vertex of the image or the pixel array as an origin and based on the resolution (7*7) of the image, that is, each pixel in the image represents a coordinate.

For example, in the example as shown in FIG. 2A, the coordinates of the first rectangular region ① can be expressed as: a starting coordinate (2, 1), and an end coordinate (2, 3); the coordinates of the second rectangular region ② can be expressed as: a starting coordinate (4, 1), and an end coordinate (4, 5); and the coordinates of the third rectangular region ③ can be expressed as: a starting coordinate (3, 3), and an end coordinate (3, 3).

For example, in the example as shown in FIG. 2B, the coordinates of the first rectangular region ① may be expressed as: a starting coordinate (2, 1) and an end coordinate (4, 5).

For example, in the example shown as in FIG. 2C, the coordinates of the first rectangular region ① can be expressed as: a starting coordinate (1, 1), and an end coordinate (1, 5); the coordinates of the second rectangular region ② can be expressed as: a starting coordinate (2, 1), and an end coordinate (4, 1); the coordinates of the third rectangular region ③ can be expressed as: a starting coordinate (4, 2), and an end coordinate (4, 5); and the coordinates of the fourth rectangular region ④ can be expressed as: a starting coordinate (2, 5), and an end coordinate (3, 5).

For example, a compression unit for acquiring the start coordinates and the end coordinates of the N rectangular regions may be provided, and the start coordinates and the end coordinates of the N rectangular regions may be acquired by the compression unit, thereby obtaining the compressed data after compressing the image. For example, the compression unit may be implemented by the central processing unit (CPU), the image processor (GPU), the tensor processor (TPU), the field programmable logic gate array (FPGA), or other forms of processing units with data processing capabilities and/or instruction execution capabilities and corresponding computer instructions.

In at least one embodiment of the present disclosure, because the rectangular region can be represented by only two coordinates including the start coordinate and the end coordinate, in the subsequent transmission process, only the start coordinate and the end coordinate need to be transmitted, and there is no need to transmit every pixel in the image, thereby greatly reducing the amount of transmitted data in the case where the compressed data is used for data transmission. Therefore, dividing the first pixels in the image into a plurality of rectangular regions and representing the plurality of rectangular regions in the form of the start coordinates and the end coordinates can help to improve the compression rate of the image, and in the case where the compressed data is used for data transmission, the transmission rate can be further improved.

Figure 3:
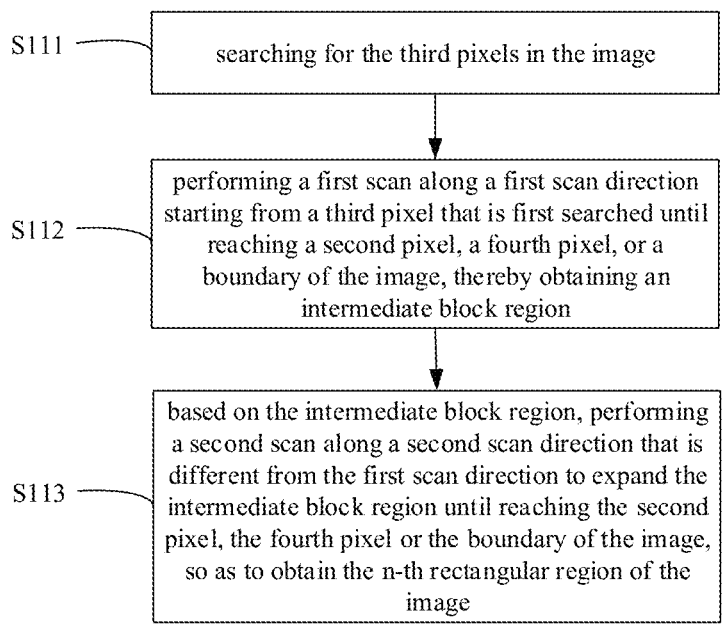
FIG. 3 is a flowchart of a dividing method provided by at least one embodiment of the present disclosure.

FIG. 3 is a flowchart of a dividing method provided by at least one embodiment of the present disclosure. That is, FIG. 3 is a flowchart of an example of step S110 as shown in FIG. 1A. For example, in the example as shown in FIG. 3, the dividing method includes steps S111 to S113. Hereinafter, referring to FIG. 3, taking an n-th (n is an integer greater than or equal to one and less than or equal to N) rectangular region as an example, the image processing method provided by the embodiment of the present disclosure will be described.

Step S111: searching for the third pixels in the image.

For example, in the case where n is equal to one, that is, in the case of determining a first rectangular region of the image, the pixels of the image can be scanned row by row or column by column from the origin of the image to search for the first pixels in the image. In the case where any first pixel is searched, step S112 is performed.

For example, in the case where n is greater than 1, that is, in the case where at least one rectangular region has been determined, the rectangular region to be determined needs to be determined from the first pixels (i.e., the third pixels) of the undetermined rectangular region, so as to ensure that the respective rectangular regions do not overlap with each other, reduce the amount of rectangular regions, and increase the compression rate of the image.

For example, starting from the origin of the image, the pixels of the image can be scanned row by row or column by column to search for the third pixels in the image. In the case where any third pixel is searched, step S112 is performed.

Step 112: performing a first scan along a first scan direction starting from a third pixel that is first searched until reaching a second pixel, the fourth pixel, or a boundary of the image, thereby obtaining an intermediate block region.

For example, for convenience and conciseness of description, the first pixels of the determined rectangular region are denoted as the fourth pixels. The following embodiment is the same as those described herein and similar portions will not be described in detail.

Here, the intermediate block region is a rectangular region including only the first pixel.

Step S113: based on the intermediate block region, performing a second scan along a second scan direction that is different from the first scan direction to expand the intermediate block region until reaching the second pixel, the fourth pixel or the boundary of the image, so as to obtain the n-th rectangular region of the image.

For step S112 and step S113, for example, in some examples, the first scan direction is one selected from a group consisting of a row direction (an x-axis direction as shown in FIGS. 2A-2C) and a column direction (a y-axis direction as shown in FIGS. 2A-2C) of the pixel array, correspondingly, the second scan direction is the other one selected from the group consisting of the row direction and the column direction of the pixel array. For example, in the case where the first scan direction is the row direction, the second scan direction is the column direction; or, in the case where the first scan direction is the column direction, the second scan direction is the row direction, the embodiments of the present disclosure are not limited to this case.

For example, in this example, the first scan can be performed by taking the third pixel that is first searched as the starting point and along the row direction or the column direction until reaching the second pixel, the fourth pixel, or the boundary of the image. In this case, the region only including the first pixels is the intermediate block region; and then, correspondingly, the second scan is performed along the column direction or row direction to expand the intermediate block region until reaching the second pixel, the fourth pixel, or the boundary of the image, so as to obtain the n-th rectangular region of the image.

For example, in an example, taking the example as shown in FIG. 2B as an example, a method for determining the n-th rectangular region (for example, the first rectangular region ① as shown in FIG. 2B) is described. It should be noted that the following description takes a case that the first scan direction is the row direction and the second scan direction is the column direction as an example, the embodiments of the present disclosure are not limited to this case.

For example, in the example as shown in FIG. 2B, the search operation is performed along the x-axis and starting from a coordinate (0, 0), in the case where the third pixel that is first searched, that is, the black pixel (2, 1), is searched, and the dividing process starts. For example, taking (2,1) as the starting point, the search operation is performed along the x-axis (the row direction, the first scan direction) in the form of a point scan method (i.e., the first scan) until reaching the second pixel (i.e., the white pixel (5, 1)), in this case, the intermediate block region is obtained. The start coordinate of the intermediate block region is (2, 1), and the end coordinate of the intermediate block region is (4, 1). For example, after determining the intermediate block region, continuing to perform the search operation along the y-axis direction (the column direction, the second scan direction) in the form of a line-segment scan method until reaching the second pixels (i.e., white pixels (2, 6)-(4, 6)), so as to determine the n-th rectangular region. For example, the start coordinate of the n-th rectangular region is (2, 1), and the end coordinate of the n-th rectangular region is (4, 5). It should be noted that in this example, the first scan direction may also be the y-axis, and the second scan direction may also be the x-axis, and the embodiments of the present disclosure are not limited thereto.

For example, in another example, taking the example as shown in FIG. 2C as an example, the method for determining the n-th rectangular region (e.g., the second rectangular region ②) is introduced.

For example, after determining the n-th rectangular region, the image is scanned row by row or column by column by taking the origin of the binarized image or a starting first pixel of the n-th rectangular region as the starting point, so as to determine a next third pixel, thereby determining an (n+1)-th rectangular region of the N rectangular regions. That is, in the case where n is greater than one, after the (n−1)-th rectangular region is determined, taking the origin of the binarized image or a starting first pixel of the (n−1)-th rectangular region as a starting point, the image is scanned row by row or column by column to determine the next third pixel, thereby determining the n-th rectangular region of the N rectangular regions. It should be noted that the following embodiments are the same as those described herein and similar portions will not be repeated again.

For example, the starting first pixel of the n-th rectangular region is the third pixel, that is first searched, scanned in the case where the n-th rectangular region is determined.

For example, as shown in FIG. 2C, because in the case of scanning the first rectangular region ①, it has been scanned row by row from the origin (0, 0) of the binarized image to the first rectangular region ①, therefore, in the case of determining the second rectangular region ② (the n-th rectangular region), the scan operation can be performed by directly taking the starting first pixel (1, 1) of the first rectangular region ① (the (n−1)-th rectangular region) as the starting point, so as to avoid missing other third pixels in the image. For example, the scan methods of the remaining rectangular regions are the same as those described herein and will not be repeated.

For example, in the example shown in FIG. 2C, taking the origin (0, 0) of the binarized image or the starting first pixel (1, 1) of the first rectangular region ① ((n−1)-th rectangular region) as the starting point, the image is scanned row by row or column by column. For example, the column-by-column scan is taken as an example for introduction below, and the embodiments of the present disclosure do not limit this case.

For example, in the example shown in FIG. 2C, in the case of determining the second rectangular region ②, taking the starting first pixel (1, 1) of the first rectangular region ① ((n−1)-th rectangular region) as the starting point, the scan operation is performed along the y-axis direction (of course, it may also be along the x-axis direction) to search for the third pixels. As shown in FIG. 2C, in the case where the third pixel (2, 1) that is first searched is searched in the y-axis direction, the dividing process starts. For example, after scanning to the third pixel (2, 1), the search operation (i.e., the first scan) is performed along the x-axis (the row direction, the first scan direction) and starting from (2, 1) until reaching the second pixel (i.e., the white pixel (5, 1)), in this case, the intermediate block region is obtained. The start coordinate of the intermediate block region is (2, 1), and the end coordinate of the intermediate block region is (4, 1). For example, after determining the intermediate block region, continuing to perform the search operation along the y-axis direction (the column direction, the second scan direction) until reaching the second pixels (i.e., white pixels (2, 2)-(2, 3)), so as to determine the second rectangular region ②. For example, the start coordinate of the second rectangular region ② is (2, 1), and the end coordinate of the second rectangular region ② is (4, 1). It should be noted that in this example, the first scan direction may also be the y-axis, and the second scan direction may also be the x-axis, and the embodiments of the present disclosure are not limited thereto.

For step S112 and step S113, for example, in other examples, the first scan direction is a diagonal direction with the third pixel that is first searched as a vertex and with an angle of 45° to the row direction or column direction. For example, the scan region generated by the first scan is a square region with the third pixel that is first searched as the vertex, the first scan direction is the diagonal direction with the third pixel that is first searched as the starting point in the square region, and the second scan direction is the row direction or column direction of the pixel array.

For example, in this example, the square region is expanded until either side of the square region reaches the second pixel, the fourth pixel, or the boundary of the image to determine the intermediate block region.

For example, in this example, the second scan is a point scan method or a line-segment scan method. For example, in the case where the intermediate block region includes only one pixel, after determining the scan direction, the second scan is a point scan method, that is, only judging whether one pixel along the scan direction is the second pixel and/or the fourth pixel or not at each time, if the one pixel along the scan direction is not the second pixel and/or the fourth pixel, continuing to expand the intermediate block region; if the one pixel along the scan direction is the second pixel and/or the fourth pixel, stopping scanning. For example, in the case where the intermediate block region comprises pixels arranged in multiple rows and multiple columns, after determining the scan direction, the second scan is a line-segment scan method (for example, a length of the line segment includes the amount of pixels included in each row or column), that is, only judging whether pixels in one row or one column along the scan direction include the second pixel and/or the fourth pixel or not at each time, if the pixels in one row or one column along the scan direction do not include the second pixel and/or the fourth pixel (that is, all the pixels are the first pixels), continuing to expand the intermediate block region; if the pixels in one row or one column along the scan direction include the second pixel and/or the fourth pixel (that is, the pixels include at least one second pixel and/or fourth pixel), stopping scanning. For example, as shown in FIG. 2B, in the case of scanning along the row direction, three pixels on one column are scanned at each time; in the case of scanning along the column direction, three pixels on one row are scanned at each time, so it is called a line-segment scan method.

Figure 4:
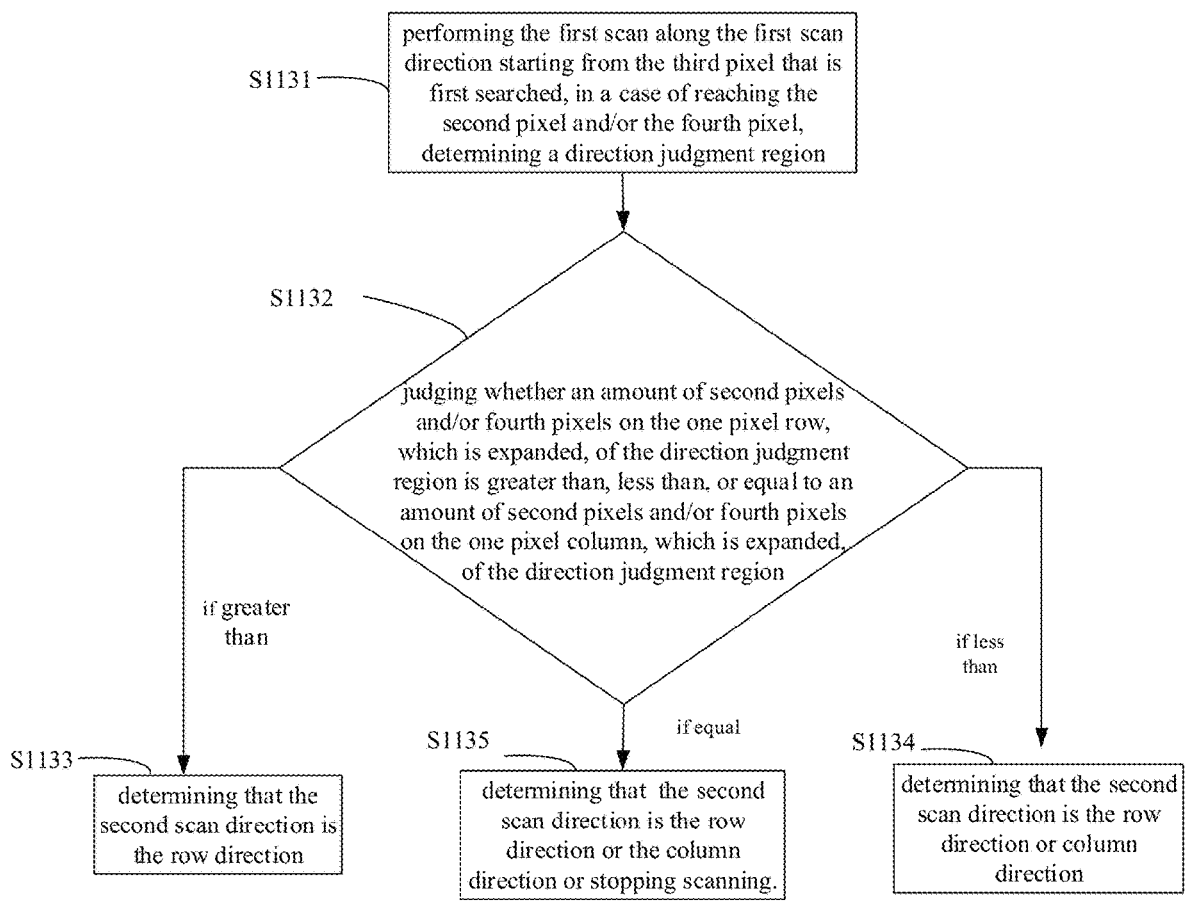
FIG. 4 is a flowchart of a method for determining a second scan direction provided by at least one embodiment of the present disclosure.

In this example, FIG. 4 shows a flowchart of a method for determining a second scan direction provided by at least one embodiment of the present disclosure. That is, FIG. 4 is a flowchart of at least one example of step S130 as shown in FIG. 3. For example, in the example as shown in FIG. 4, the dividing method includes steps S1131 to S1135. Hereinafter, referring to FIG. 4, the image processing method provided by an embodiment of the present disclosure will be described.

Step S1131: performing the first scan along the first scan direction starting from the third pixel that is first searched, in the case of reaching the second pixel and/or the fourth pixel, determining a direction judgment region.

Step S1132: judging whether an amount of second pixels and/or fourth pixels on the one pixel row, which is expanded, of the direction judgment region is greater than, less than, or equal to an amount of second pixels and/or fourth pixels on the one pixel column, which is expanded, of the direction judgment region.

Step S1133: if the amount of second pixels and/or fourth pixels on the one pixel row, which is expanded, of the direction judgment region is greater than the amount of second pixels and/or fourth pixels on the one pixel column, which is expanded, of the direction judgment region, determining that the second scan direction is the row direction.

Step S1134: if the amount of second pixels and/or fourth pixels on the one pixel row, which is expanded, of the direction judgment region is less than the amount of second pixels and/or fourth pixels on the one pixel column, which is expanded, of the direction judgment region, determining that the second scan direction is the column direction.

Step S1135: if the amount of second pixels and/or fourth pixels on the one pixel row, which is expanded, of the direction judgment region is equal to the amount of second pixels and/or fourth pixels on the one pixel column, which is expanded, of the direction judgment region, determining that the second scan direction is the row direction or the column direction or stopping scanning.

For example, the direction judgment region is a scan region obtained by expanding the intermediate block region along the diagonal direction by one pixel row and one pixel column. For example, because the direction judgment region is the scan region obtained by expanding the intermediate block region along the diagonal direction by one pixel row and one pixel column, and the intermediate block region is a region only including the first pixels (i.e., black pixels), therefore, the second scan direction can be determined by judging the amount of second pixels and/or fourth pixels included in the extended row (for example, denoted as the last row) and the amount of second pixels and/or fourth pixels included in the extended column (for example, denoted as the last column) in the direction judgment region, respectively.

For example, if the amount of second pixels and/or fourth pixels on the last row of the direction judgment region is equal to the amount of second pixels and/or fourth pixels on the last column of the direction judgment region, pixels in the last row and the pixels in last column are all second pixels and/or fourth pixels, or in the case where pixels in a part, which overlaps an orthographic projection of the intermediate block region, of the last row and the last column are not all the third pixels, the scanning is stopped, such as determining the third rectangular region ③ in 2A; if the amount of second pixels and/or fourth pixels on the last row of the direction judgment region is equal to the amount of second pixels and/or fourth pixels on the last column of the direction judgment region, and the pixels in a part, which overlaps the orthographic projection of the intermediate block region, of the last row and the last column are all the third pixels, the second scan direction is the row direction or the column direction, such as determining the first rectangular region ① in FIG. 2C. The specific determination method will be described in detail below, and will not be repeated here.

For example, taking the image shown in FIG. 2A being the number 4 as an example, the above steps will be described.

Starting from the coordinate (0, 0), the search operation is performed along the x-axis, and the dividing process starts in the case where the third pixel (2, 1) that is first searched is searched. Starting from (2, 1), the search operation is performed along the diagonal direction (for example, along the direction from (2, 1) to (3, 2)). For example, in the case of searching in the diagonal direction, the scan region generated by the first scan is a square region (that is, a region surrounded the third pixel (2, 1), the third pixel (2, 2), the second pixel (3, 1), and the second pixel (3, 2)) with the third pixel that is first searched as the vertex. For example, first, determining whether the square region includes the second pixel and/or the fourth pixel. If the square region does not include the second pixel and/or the fourth pixel, continuing to expand along the diagonal direction and judge, until reaching the second pixel, the fourth pixel, or the boundary of the image, thereby obtaining the intermediate block region.

As shown in FIG. 2A, because the square region includes the second pixel (3, 1) and the second pixel (3, 2), the intermediate block region is a region only including the third pixel (2, 1).

For example, the direction judgment region is a scan region obtained by expanding the intermediate block region (2, 1) along the diagonal direction by one pixel row and one pixel column, that is, the direction judgment region is the square region surrounded by the above-mentioned third pixel (2, 1), the third pixel (2, 2), the second pixel (3, 1), and the second pixel (3, 2).

After the direction judgment region is determined, step S1132 is performed. That is, the amount of second pixels and/or fourth pixels on the last row and the amount of second pixels and/or fourth pixels on the last column in the direction judgment region are determined.

For example, the last row of the above-mentioned direction judgment region includes only one second pixel (3, 2), and the last column of the above-mentioned direction judgment includes only two second pixels (3, 1) and (3, 2). Because the amount of second pixels on the last row of the direction judgment region is smaller than the amount of second pixels on the last column of the direction judgment region, the second scan direction is the column direction. For example, because the intermediate block region includes only one pixel (2, 1), after the scan direction is determined, the second scan is a point scan method, that is, that is, only judging whether one pixel along the column direction is the second pixel or not at each time, if the one pixel along the column direction is not the second pixel, continuing to expand the intermediate block region; and if the one pixel along the column direction is the second pixel, stopping scanning That is, in step S113, the intermediate block region (2, 1) is continuously expanded in the column direction until reaching the second pixel (2, 4) in the column direction, and the size of the first rectangular region ① is determined. That is, the start coordinate of the first rectangular region ① is (2, 1), and the end coordinate of the first rectangular region ① is (2, 3). It should be noted that the following embodiments are the same as those described herein and similar portions will not be repeated again.

For example, according to the above method, the second rectangular region ② and the third rectangular region ③ as shown in FIG. 2A are sequentially determined.

For example, after determining the first rectangular region ①, taking the starting first pixel (2, 1) of the first rectangular region ① as the starting point, continuing to scan along the x-axis to determine that the coordinate of a starting first pixel of the second rectangular region ② is (4, 1) as the third pixel. Starting from the third pixel (4, 1), the search operation is performed along the diagonal line to determine the scan region (the region surrounded by the third pixel (4, 1), the third pixel (4, 2), the second pixel (5, 1), and the second pixel (5, 2)) generated by the first scan. For example, next, the method for determining the second rectangular region ② is similar to the method for determining the first rectangular region ①, and will not be repeated here again. For example, finally, it is determined that the start coordinate of the second rectangular region ② is (4, 1), and the end coordinate of the second rectangular region ② is (4, 5).

For example, after the second rectangular region ② is determined, taking the starting first pixel (4, 1) of the second rectangular region ② as the starting point, the searching for the third pixels row by row along the x-axis is continued, and removing pixels in the determined rectangular region, that is, removing the fourth pixels, so as to determine that the coordinate of the starting first pixel of the third rectangular region ③ is (3, 3). Taking the third pixel (3, 3) as the starting point, the search operation is performed along the diagonal line to determine the scan region (the region surrounded by the third pixel (3, 3), the fourth pixel (4, 3), the second pixel (3, 4), and the fourth pixel (4, 4)) generated by the first scan. Because, in the scan region, the amount of second pixels and/or fourth pixels on the last row (for example, including the second pixel (3, 4) and the fourth pixel (4, 4)) is equal to the amount of second pixels and/or fourth pixels on the last column (e.g., including the fourth pixel (4, 3) and the fourth pixel (4, 4)), and the last row and the last column in the scan region do not include the third pixel. Therefore, the search operation is stopped, and the start coordinate of the third rectangular region ③ is (3, 3) and the end coordinate of the third rectangular region ③ is (3, 3).

For example, after determining the third rectangular region ③, according to the above method, taking the starting first pixel (3, 3) of the third rectangular region ③ as the starting point, continuing to scan along the x-axis until all pixels are scanned.

For example, taking the image shown in FIG. 2B as a block as an example, the above steps will be described.

Starting from the coordinate (0, 0), the search operation is performed along the x-axis, and the dividing process starts in the case where the third pixel (2, 1) that is first searched is searched. The (2, 1) is taken as the starting point to search along the diagonal direction (for example, along the direction from (2, 1) to (3, 2)). For example, in the case of searching along the diagonal direction, the scan region generated by the first scan is a square region (that is, the region surrounded by the third pixel (2, 1), the third pixel (2, 2), the third pixel (3, 1), and the third pixel (3, 2)) with the third pixel that is first searched as the vertex. For example, first, judging whether the square region includes the second pixel and/or the fourth pixel, if the square region does not include the second pixel and/or the fourth pixel, continuing to expand along the diagonal direction and judge until reaching the second pixel, the fourth pixel, or the boundary of the image, and therefore, the intermediate block region is obtained.

For example, judging whether the square region surrounded by (2, 1), (3, 1), (2, 2), (3, 2) comprises the second pixel and/or fourth pixel or not, if the square region surrounded by (2,1), (3,1), (2,2), (3,2) does not comprise the second pixel and/or fourth pixel, continuing to expand the search region, that is, judging whether the square region surrounded by (2,1), (4,1), (2,3), (4,3) comprises the second pixel and/or fourth pixel, if the square region surrounded by (2,1), (4,1), (2,3), (4,3) does not comprise the second pixel and/or fourth pixel, continuing to expand the search region, that is, judging whether the square region surrounded by (2,1), (5,1), (2,4), (5,4) comprises the second pixel and/or fourth pixel, if the square region surrounded by (2,1), (5,1), (2,4), (5,4) comprises the second pixel, the intermediate block region (for example, the region surrounded by the third pixels (2, 1), (4, 1), (2, 3), (4, 3)) is obtained. And then, go to the next step to determine the second scan direction.

As shown in FIG. 2B, after determining the intermediate block region, the direction judgment region is obtained by extending the intermediate block region along the diagonal line direction by one pixel row and one pixel column, that is, the direction judgment region is the square region surrounded by (2, 1), (5, 1), (2, 4), (5, 4).

After the direction judgment region is determined, step S1132 is performed. That is, the amount of second pixels and/or fourth pixels on the last row and the amount of second pixels and/or fourth pixels on the last column in the direction judgment region are determined.

For example, the last row in the above direction judgment region (that is, the region surrounded by pixels (2, 4) and (5, 4)) includes only one second pixel (5, 4); the last column (i.e., the region surrounded by the pixels (5, 1) and (5, 4)) includes 4 second pixels, namely the second pixel (5, 1) to the second pixel (5, 4). Because the amount of second pixels in the last row of the direction judgment region is smaller than the amount of second pixels in the last column of the direction judgment region, the second scan direction is the column direction. For example, because the intermediate block region comprises pixels arranged in 3 rows and 3 columns, after the scan direction is determined, the second scan is a line-segment scan method, that is, only judging whether three pixels in one row along the column direction include the second pixel and/or the fourth pixel or not at each time, if the three pixels in one row along the column direction do not include the second pixel and/or the fourth pixel (that is, the three pixels are the first pixels), continuing to expand the intermediate block region; if the three pixels in one row along the column direction include the second pixel and/or the fourth pixel (that is, the three pixels include at least one second pixel), stopping scanning That is, in step S113, continuing to expand the intermediate block region in the column direction until reaching the second pixel (2, 6) to the second pixel (4, 6) in the column direction, thereby determining the size of the first rectangular region ①. That is, the start coordinate of the first rectangular region ① is (2, 1), and the end coordinate of the first rectangular region ① is (4, 5). It should be noted that the following embodiments are the same as those described herein and similar portions will not be repeated again.

For example, after determining the first rectangular region ①, according to the above method, the starting first pixel (2, 1) of the first rectangular region ① is taken as the starting point, to continue to scan along the x-axis until all pixels are scanned.

For example, taking a case that the image as shown in FIG. 2C is a rectangular frame as an example, the above steps will be described.

Starting form the coordinate (0, 0), the search operation is performed along the x-axis, and the dividing process starts in the case where the third pixel (1, 1) that is first searched is searched. The (1, 1) is taken as the starting point to search along the diagonal direction (for example, a direction from (1, 1) to (2, 2)). For example, in the case of searching along the diagonal direction, the scan region generated by the first scan is a square region (that is, the region surrounded by the third pixel (1, 1), the third pixel (2, 1), the third pixel (1, 2), and the second pixel (2, 2)) with the third pixel that is first searched as the vertex. For example, firstly, determining whether the square region includes the second pixel and/or the fourth pixel or not, if the square region does not include the second pixel and/or the fourth pixel, continuing to expand along the diagonal direction and judge until searching the second pixel, the fourth pixel, or the boundary of the image, thereby obtaining the intermediate block region.

As shown in FIG. 2C, because the second pixel (2, 2) is included in the square region, the intermediate block region is a region only including the third pixel (1, 1).

For example, the direction judgment region is a scan region obtained by expanding the intermediate block region (1, 1) along the diagonal direction by one pixel row and one pixel column, that is, the direction judgment region is the square region surrounded by the third pixel (1, 1), the third pixel (2, 1), the third pixel (1, 2), and the second pixel (2, 2).

After the direction judgment region is determined, step S1132 is performed. That is, the amount of second pixels and/or fourth pixels on the last row and the amount of second pixels and/or fourth pixels on the last column in the direction judgment region are determined.

For example, the above direction judgment region includes only one second pixel, that is, the second pixel (2, 2), in the last row, and includes only one second pixel, that is, the second pixel (2, 2), in the last column. Because the amount of second pixels in the last row of the direction judgment region is equal to the amount of second pixels in the last column of the direction judgment region, and the pixels in the area, which overlaps the orthographic projection of the intermediate block region, of the last row and the last column are all the third pixels, and therefore, the second scan direction may be the row direction or the column direction. For example, in this example, a case of scanning along the column direction is taken as an example for description. That is, in step S113, the intermediate block region (1, 1) is continuously expanded along the column direction until reaching the second pixel (1, 5) in the column direction, and the size of the first rectangular region ① is determined. That is, the start coordinate of the first rectangular region ① is (1, 1), and the end coordinate of the first rectangular region ① is (1, 5).

For example, according to the above method, the second rectangular region ② as shown in FIG. 2C is sequentially determined.

For example, after determining the first rectangular region ①, the starting first pixel (1, 1) of the first rectangular region ① is taken as the starting point to continue to scan along the x-axis to determine that the coordinate of the starting first pixel of the second rectangular region ② is (2, 1). Starting from the third pixel (2, 1), the search operation is performed along the diagonal line to determine the scan region (the region surrounded by the third pixel (2, 1), the third pixel (3, 1), the second pixel (2, 2), and the second pixel (3, 2)) generated by the first scan. For example, next, the method for determining the second rectangular region ② is similar to the method for determining the first rectangular region ①, and will not be repeated here again. For example, finally, it is determined that the start coordinate of the second rectangular region ② is (2, 1), and the end coordinate of the second rectangular region ② is (4, 2).

For example, after the second rectangular region ② is determined, according to the above method, the starting first pixel (2, 1) of the second rectangular region ② is taken as the starting point to determine the third rectangular region ③ and the fourth rectangular region ④, and continue to scan along the x-axis until all pixels are scanned.

Figure 5:
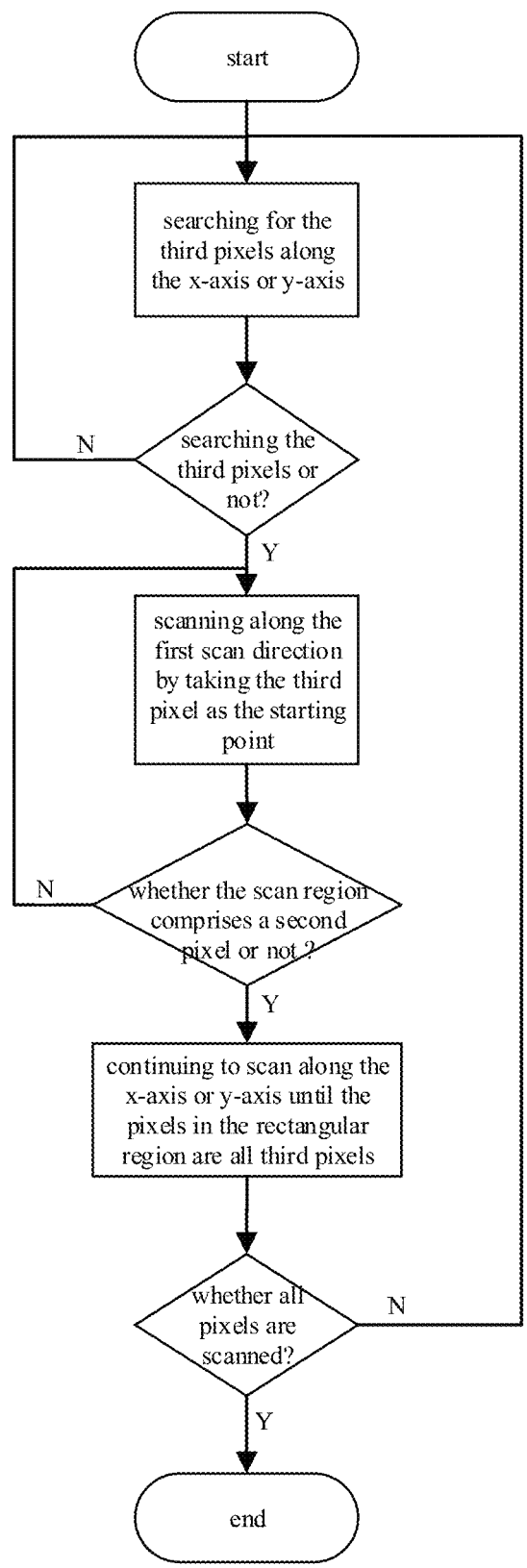
FIG. 5 is a system flowchart of an image processing method provided by at least one embodiment of the present disclosure.

FIG. 5 is a system flowchart of an image processing method provided by at least one embodiment of the present disclosure. Hereinafter, an image processing method provided by at least one embodiment of the present disclosure will be described with reference to FIG. 5.

First, taking the vertex of the image as the origin (0, 0), scanning the third pixel along the x-axis or y-axis direction and determining whether the third pixel is scanned. If the third pixel is not scanned, the scanning is continued; if the third pixel is scanned, the third pixel is taken as the starting point to scan in the first scan direction, and it is determined whether the second pixel and/or the fourth pixel are included in the scan region. If the second pixel and/or the fourth pixel are not included in the scan region, the above judgment is continued. If the second pixel and/or the fourth pixel are included in the scan region, it is determined to continue scanning along the x-axis or the y-axis according to the above step S1131-step S1135 until all pixels in the rectangular region are the third pixels, thereby determining a rectangular region. And then, taking the first pixel of the rectangular region as a starting point, continuing to scan other rectangular regions until all the pixels of the image are scanned.

By dividing the image into the N rectangular regions, and representing these N rectangular regions in the forms of the start coordinates and the end coordinates, thereby effectively reducing the transmission data of the image in the case where the image is used for framing and transmission, improving the compression rate of the image, and therefore, in the case where the compressed data is used for transmission, the problems, such as long time-consuming in the case where the NFC and other low-speed communication technologies are applied to the electronic ink screen is solved, and the power consumption of the electronic ink screen is reduced.

Figure 6:
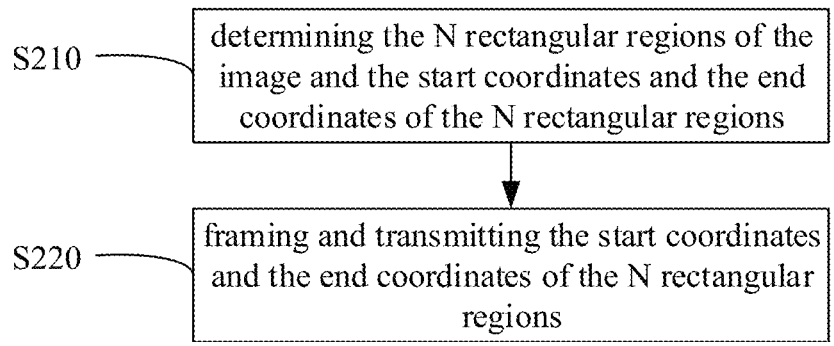
FIG. 6 is a schematic diagram of a data transmission method provided by at least one embodiment of the present disclosure.

At least one embodiment of the present disclosure also provides a data transmission method. FIG. 6 is a flowchart of a data transmission method provided by at least one embodiment of the present disclosure. As shown in FIG. 6, the data transmission method includes steps S210 to S220. Hereinafter, the data transmission method according to an embodiment of the present disclosure will be described with reference to FIG. 6.

Step S210: determining the N rectangular regions of the image and the start coordinates and the end coordinates of the N rectangular regions according to the image processing method providing by at least one embodiment of the present disclosure.

Step S220: framing and transmitting the start coordinates and the end coordinates of the N rectangular regions.

For step S210, reference may be made to the description of the image processing method shown in FIG. 1 to FIG. 5, and will not be repeated here again.

For step S220, for example, the start coordinates and the end coordinates of the N rectangular region are expressed in the form of bytes and are framed to transmit.

Figure 7:
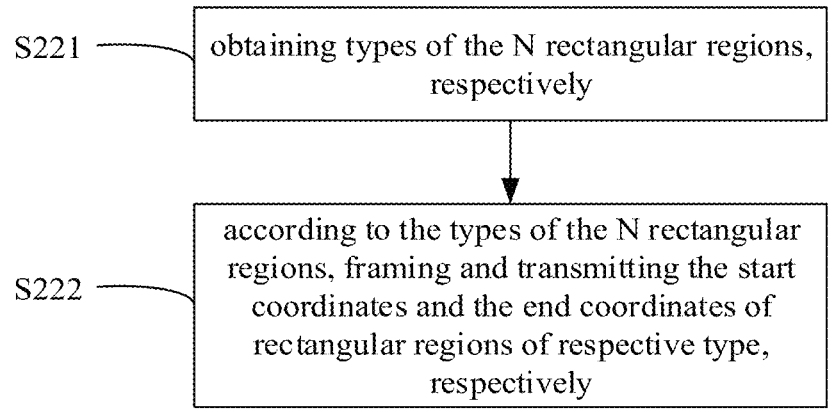
FIG. 7 is a flowchart of a framing and transmission method provided by at least one embodiment of the present disclosure.

FIG. 7 is a flowchart of a framing transmission method provided by at least one embodiment of the present disclosure. That is, FIG. 7 is a flowchart of at least one example of step S220 as shown in FIG. 6. For example, in the example as shown in FIG. 7, the framing and transmission method includes steps S221 to S222. Hereinafter, referring to FIG. 7, the data transmission method provided by an embodiment of the present disclosure will be described.

Step S221: obtaining types of the N rectangular regions, respectively.

For example, the types of the N rectangular regions comprise a single-point block format, a strip-type format with a width of 1 pixel, a square matrix format, a strip-type format with a width of k pixels (k is an integer greater than one), and the like.

Step S222: according to the types of the N rectangular regions, framing and transmitting the start coordinates and the end coordinates of rectangular regions of respective types, respectively.

For example, the end coordinates are expressed as a scan direction and a length. For example, the length is a difference between a start coordinate and an end coordinate in the row direction and/or column direction.

For example, in the case where the type of the rectangular region is a single-point block format (for example, the third rectangular region ③ as shown in FIG. 2A), the start coordinate and the end coordinate of the rectangular region are the same, and the length is zero. For example, the rectangular region having the single-point block format can be compressed into the frame format as shown in Table 1. As shown in Table 1, the rectangular region having the single-point block format can be compressed to 32 bits, that is, 4 bytes.

TABLE 1

| Frame head | | start coordinate | |
|---|---|---|---|
| type | direction | X | Y |
| 3 bit | 1 bit | 12 bit | 16 bit | single-point block format

For example, in the case where the type of the rectangular region is a strip-type format with a width of one pixel (for example, the first rectangular region ① or the second rectangular region ② as shown in FIG. 2A), an abscissa (x) of the start coordinate and an abscissa (x) of the end coordinate of the rectangular region are the same, and an ordinate (y) of the start coordinate and an ordinate (y) of the end coordinate of the rectangular region are different, and the length is the difference between the start coordinate and the end coordinate in the y-axis direction; or, the y coordinate of the start coordinate and the y coordinate of the end coordinate of the rectangular region the same and the x coordinate of the start coordinate and the x coordinate of the end coordinate of the rectangular region are different (for example, the second rectangular region ② as shown in FIG. 2C), the length is the difference between the start coordinate and the end coordinate in the x-axis direction. For example, the rectangular region having a strip-type format with a width of one pixel can be compressed into the frame format as shown in Table 2. As shown in Table 2, the rectangular region having the strip-type format with a width of one pixel can be compressed to 48 bits, that is, 6 bytes.

TABLE 2 strip-type format with width of 1 pixel

| Frame head | | start coordinate | | length |
|---|---|---|---|---|
| type | direction | X | Y | L |
| 3 bit | 1 bit | 12 bit | 16 bit | 16 bit |

For example, in the case where the type of rectangular display region is square matrix format (i.e., square region), the x coordinate of the start coordinate and the x coordinate of the end coordinate of the rectangular region are different, the y coordinate of the start coordinate and the y coordinate of the end coordinate of the rectangular region are different, and the length is the difference between the start coordinate and the end coordinate in the x direction or the difference between the start coordinate and the end coordinate in the y direction. For example, the rectangular region having the square matrix format can be compressed into the frame format as shown in Table 3. As shown in Table 3, the rectangular region having the square matrix format can be compressed to 48 bits, that is, 6 bytes.

TABLE 3

| square matrix format | | | | |
|---|---|---|---|---|
| Frame head | | start coordinate | | length |
| type | direction | X | Y | L |
| 3bit | 1 bit | 12 bit | 16 bit | 16 bit |

In the case where the type of the rectangular region is a strip-type format with a width of k pixels (that is, the length and the width of the rectangular region are different, for example, the first rectangular region ① as shown in FIG. 2B, a strip-type format with a length of 5 pixels and a width of 3 pixels), the x coordinate of the start coordinate and the x coordinate of the end coordinate of the rectangular region are different, the y coordinate of the start coordinate and the y coordinate of the end coordinate of the rectangular region are different, and the length comprises the difference between the start coordinate and the end coordinate in the x direction and the difference between the start coordinate and the end coordinate in the y direction. For example, in this example, the length can also be replaced directly with the end coordinate. The rectangular region having the strip-type format with the width of k pixels can be compressed into the frame format as shown in Table 4. As shown in Table 4, the rectangular region having the strip-type format with the width of k pixels can be compressed to 64 bits, that is, 8 bytes.

TABLE 4

| strip-type format with a width of k pixels | | | | | |
|---|---|---|---|---|---|
| Frame head | | start coordinate | | end coordinate/length | |
| type | direction | X | Y | X | Y |
| 3 bit | 1 bit | 12 bit | 16 bit | 16 bit | 16 bit |

For example, the types of the rectangular region may include a plurality of types, for example, 8 (that is, $2^3$) types, so in the above frame format, the type in the frame head is set to 3 bits. For example, the binary form of the type can be expressed as 000, 001, 010, . . . , 111. The direction from the start coordinate to the end coordinate in the rectangular region, for example, may include 2 (that is, $2^1$) types, for example, along the x-axis direction or along the y-axis direction, and therefore, in the above frame format, the direction in the frame head is set to one bit, that is, the binary form of the direction is specifically expressed as zero and one. For example, in order to facilitate to calculate the amount of bytes, the bytes of the start coordinate, the bytes of the length, or the bytes of the end coordinate, and the bytes in the frame head can be set according to actual conditions, and the embodiments of the present disclosure do not limit this case.

For example, the resolution of the grayscale image as shown in FIG. 1B is 512*512, after the binarized image (as shown in FIG. 1C) obtained after performing the binarization process on the grayscale image is divided by the image processing method provided by at least one embodiment of the present disclosure, for example, 955 rectangular regions (as shown in FIG. 1C) can be obtained. For example, supposing that the 955 rectangular regions include 123 rectangular regions in a single-point block format, 32 rectangular regions in a square matrix format, 600 rectangular regions in a strip-type format with a width of one pixel, and 200 rectangular regions in a strip-type format with a width of k pixels, according to the amount of bytes required by each type, it can be calculated that the grayscale image requires 5884 bytes, that is, in order to display the image, 5884 bytes need to be transmitted. The specific calculation process is shown in Table 5:

TABLE 5

| | single-point block format | square matrix format | strip-type format with a width of 1 pixel | strip-type format with a width of k pixels | total |
|---|---|---|---|---|---|
| number | 123 | 32 | 600 | 200 | 955 |
| size (B) | 123 * 4 = 492 | 32 * 6 = 192 | 600 * 6 = 3600 | 200 * 8 = 1600 | 5884 |

However, in the case where the conventional image transmission method is adopted, each pixel is represented by one bit, and the total amount of transmitted data is 32768 bytes. Therefore, according to the above calculation, it can be concluded that the data transmission method provided by at least one embodiment of the present disclosure compresses data by about 5.8 times compared to the conventional transmission method. For example, the above data is only an exemplary description, and specific data may be determined according to actual conditions, and the embodiments of the present disclosure are not limited thereto.

Therefore, the data transmission method provided by the embodiments of the present disclosure can effectively reduce the transmission data, thereby solving the time-consuming problem in the transmission process.

For example, in another example, the start coordinates and the end coordinates of all rectangular regions may be directly compressed into bytes and transmitted. The following embodiments will be described by taking the rectangular regions as shown in FIG. 2A as an example.

The dividing results of the image as shown in FIG. 2A are as follows.

The first rectangular region ① includes: the start coordinate (2, 1), and the end coordinate (2, 3).

The second rectangular region ② includes: the start coordinate (4, 1), and the end coordinate (4, 5).

The third rectangular region ③ includes: the start coordinate (3, 3), and the end coordinate (3, 3).

For example, the above rectangular regions can be framed in the frame format as shown in Table 6. For example, the start coordinates and end coordinates of the respective rectangular regions are compressed, because the resolution of the image in FIG. 2A is small, each coordinate can be compressed to one byte. The compression result is as follows.

The first rectangular region ① is: 0x21, 0x23.
The second rectangular region ② is: 0x41, 0x45.
The third rectangular region ③ is: 0x33, 0x33.

Therefore, the rectangular region as shown in FIG. 2A can be compressed to 6 bytes.

However, in the case where the resolution of the image is, for example, 512*512, the x coordinate of each coordinate needs 2 bytes and the y coordinate of each coordinate needs 2 bytes, respectively (for example, the coordinate 512 in the coordinate (512, 512) can be expressed as 0200 in hexadecimal, in this case, the coordinate 512 occupies 2 bytes), therefore, the following embodiments are described by taking a case that the start coordinate occupies 4 bytes and the end coordinate occupies 4 bytes as an example.

TABLE 6

| start coordinate | | end coordinate | |
|---|---|---|---|
| x | y | x | y |

For example, the resolution of the grayscale image as shown in FIG. 1B is 512*512, after the binarized image (as shown in FIG. 1C) obtained after performing the binarization process on the grayscale image is divided by the image processing method provided by at least one embodiment of the present disclosure, for example, 955 rectangular regions (as shown in FIG. 1C) can be obtained. For example, in the case where the 955 rectangular regions are framed and transmitted using the frame format in Table 6, the start coordinate can be represented by 4 bytes and the end coordinate can be represented by 4 bytes, respectively, so that a rectangular region can be represented by 8 bytes, and therefore, the image as shown in FIG. 1A can be compressed to 7640 (that is, 955*8) bytes, that is, in order to display the image as shown in FIG. 1A, 7640 bytes need to be transferred. The data transmission method in this example can compress the data by 4.2 times the original data compared to the 32,768 bytes transmitted when using conventional image transmission method.

Therefore, the data transmission method provided by the embodiments of the present disclosure can also effectively reduce the transmission data, thereby solving the time-consuming problem in the transmission process.

Figure 8:
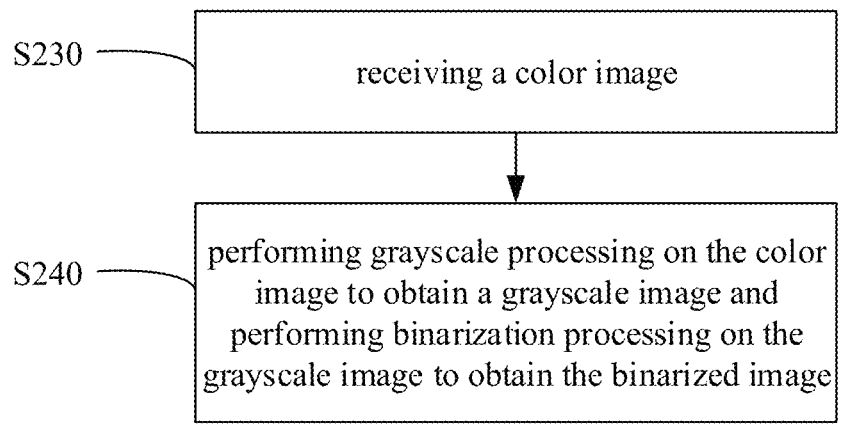
FIG. 8 is a flowchart of another data transmission method provided by at least one embodiment of the present disclosure.

FIG. 8 is a flowchart of another data transmission method provided by at least one embodiment of the present disclosure. As shown in FIG. 8, based on the example shown in FIG. 7, the data transmission method further includes steps S230 to S240. Hereinafter, the data transmission method according to an embodiment of the present disclosure will be described with reference to FIG. 8.

Step S230: receiving a color image.

For example, the original image that needs to be displayed on the electronic ink screen may be a color image.

Step S240: performing grayscale processing on the color image to obtain a grayscale image and performing binarization processing on the grayscale image to obtain the binarized image.

For example, the grayscale processing is performed on the color image to obtain a grayscale image and the binarization processing is performed on the grayscale image to obtain a binarized image, so that the image processing method and the data transmission method provided by the above embodiments of the present disclosure are implemented on the basis of the binarized image. For example, the method of the grayscale processing and the method of the binarization processing can adopt methods in the art, and the embodiments of the present disclosure do not limited the method of the grayscale processing and the method of the binarization processing.

For example, in another example, the data transmission method further includes: by a receiving terminal, receiving the start coordinates and the end coordinates, which are framed and transmitted, of the N rectangular regions of the image, and decompressing the start coordinates and the end coordinates, which are framed, transmitted, and received, of the N rectangular regions of the image, to restore to the image before division, so that the image can be displayed. For example, the start coordinates and the end coordinates of the respective rectangular regions, the formats of the respective rectangular regions, and the like are parsed out from the compressed data (the start coordinates and the end coordinates of the N rectangular regions represented in the form of bytes as shown in Tables 1 to 6 above), which is received from the receiving terminal, of the image, which is framed and transmitted, to determine the N rectangular regions determined by the image processing method. Then, an image matrix is generated according to the start coordinates and the end coordinates of the N rectangular regions, so that the image before division can be restored, thereby decompressing the transmission data to display the image before division.

For example, the receiving terminal may be a single-chip microcomputer or the like, and of course, the receiving terminal may also be other processor with higher processing performance, and the embodiments of the present disclosure do not limit the receiving terminal. The data transmission method of the embodiment of the present disclosure, by dividing the image into a plurality of rectangular regions, can easily represent and transmit the data, so that the data transmission method can be applied to some processors with lower processing performance, which effectively expands the application range of the data transmission method.

Figure 9:
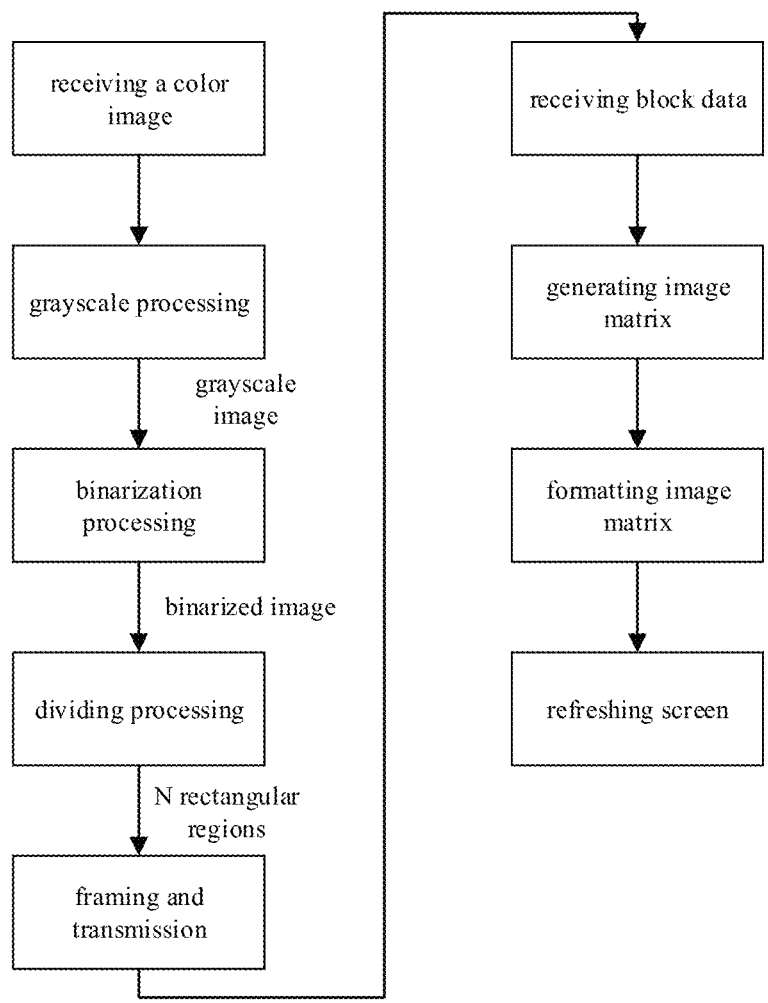
FIG. 9 is a system flowchart of a data transmission method provided by at least one embodiment of the present disclosure.

FIG. 9 is a system flowchart of a data transmission method provided by at least one embodiment of the present disclosure. Next, the data transmission method provided by at least one embodiment of the present disclosure will be described with reference to FIG. 9.

First, a color image to be displayed is received by a display device (for example, an electronic ink screen).

Then, for example, in some examples, the grayscale processing is performed on the color image to obtain a grayscale image, and the binarization processing is performed on grayscale image to obtain a binarized image, so that the image processing method (that is, the dividing process) provided by the above embodiments of the present disclosure is implemented to obtain the N rectangular regions on the basis of the binarized image, and the divided rectangular regions are framed and transmitted (data transmission method). For example, in other examples, the received color image may be directly binarized to obtain the binarized image, and the embodiments of the present disclosure are not limited thereto.

For example, the receiving terminal (for example, a single-chip microcomputer) receives the compressed data that is transmitted, and parses out the start coordinates and the end coordinates of the respective rectangular regions and the format of the respective rectangular regions based on these compressed data to determine the N rectangular regions determined according to the image processing method. Then, the corresponding image matrix (for example, the rectangular regions restored according to the start coordinates and the end coordinates) is generated according to the start coordinates and the end coordinates of the N rectangular regions, and then the image matrix is formatted to restore the image before division to refresh the screen, so that the image before the division can be displayed accurately and quickly.

It should be noted that the flow of the image processing method and the data transmission method provided by some embodiments of the present disclosure may include more or fewer operations, and these operations may be performed sequentially or in parallel. Although the flow of the image processing method and the flow of the data transmission method described above include a plurality of operations occurring in a specific order, it should be clearly understood that the order of the plurality of operations is not limited. The image processing method and the data transmission method described above may be executed once, or may be executed multiple times according to predetermined conditions.

For the technical effect of the data transmission method provided by the embodiment of the present disclosure, reference may be made to the technical effect of the image processing method provided by the embodiment of the present disclosure, and similar portions will not be repeated here.

At least one embodiment of the present disclosure also provides an image processing device for an image. For example, the image is a binarized image, and the binarized image includes a plurality of pixels. Among the plurality of pixels, a pixel having a first value is a first pixel, and a pixel having a second value is a second pixel.

Figure 10:
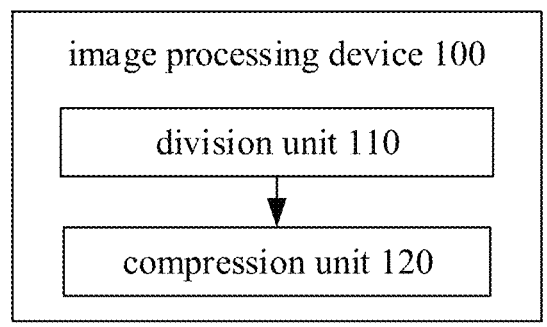
FIG. 10 is a schematic block diagram of an image processing device provided by at least one embodiment of the present disclosure.

FIG. 10 is a schematic block diagram of an image processing device provided in at least one embodiment of the present disclosure. For example, as shown in FIG. 10, in some examples, the image processing device 100 includes a division unit 110 and a compression unit 120. For example, these units may be implemented in the form of hardware (e.g., circuit) modules or software modules, and any combination of the hardware modules and the software modules.

The division unit 110 is configured to divide the image to determine N rectangular regions, which comprise only the first pixels, of the image. For example, the division unit 110 may implement step S110, and for a specific implementation method, reference may be made to the relevant description of step S110, and details are not described herein again.

The compression unit 120 is configured to obtain start coordinates and end coordinates of the N rectangular regions, respectively, thereby obtaining compressed data after compressing the image. For example, the compression unit 120 may implement step S120, for a specific implementation method, reference may be made to the relevant description of step S120, and details are not described herein again.

For example, in other examples, the image processing device 100 may further include a decompression unit (not shown in the figure). For example, the decompression unit may decompress the received start coordinates and the received end coordinates, which are framed and transmitted, of the N rectangular regions of the image to restore the image before division, so that the display of the image may be achieved. For example, the start coordinates and the end coordinates of the respective rectangular regions, the formats of the respective rectangular regions, and the like are parsed out from the compressed data (the start coordinates and the end coordinates of the N rectangular regions represented in the form of bytes shown in Tables 1 to 6 above), which is received from the receiving terminal, of the image, which is framed and transmitted, to determine the N rectangular regions determined by the image processing method. Then, an image matrix is generated according to the start coordinates and the end coordinates of the N rectangular regions, so that the image before division can be restored, thereby decompressing the transmission data to display the image before division.

It should be noted that the image processing device provided by the embodiments of the present disclosure may include more or fewer circuits or units, and the connection relationship between the respective circuits or units is not limited, and may be determined according to actual needs. The specific configuration of each circuit is not limited, and each circuit can be composed of analog devices, digital chips, or other suitable methods according to the circuit principle.

Figure 11:
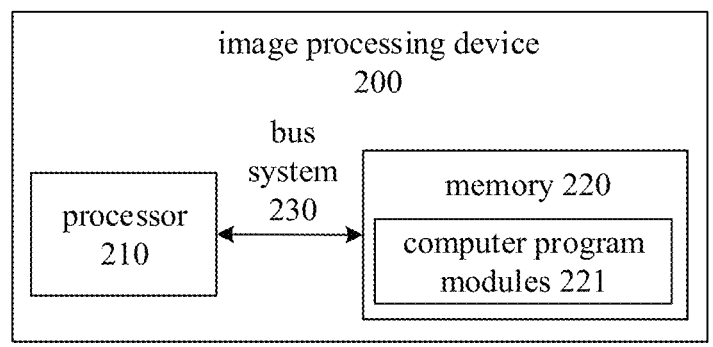
FIG. 11 is a schematic block diagram of another image processing device provided by at least one embodiment of the present disclosure.

FIG. 11 is a schematic block diagram of another image processing device provided by at least one embodiment of the present disclosure. As shown in FIG. 11, the image processing device 200 includes a processor 210, a memory 220, and one or more computer program modules 221.

For example, the processor 210 and the memory 220 are connected through the bus system 230. For example, one or more computer program modules 221 are stored in the memory 220. For example, one or more computer program modules 221 include instructions for performing the image processing method provided by any embodiment of the present disclosure. For example, the instructions in one or more computer program modules 221 may be executed by the processor 210. For example, the bus system 230 may be a commonly used serial or parallel communication bus, etc. The embodiments of the present disclosure do not limit this.

For example, the processor 210 may be a central processing unit (CPU), a field programmable logic gate array (FPGA), or other forms of processing units with data processing capabilities and/or instruction execution capabilities, and may be a general-purpose processor or a dedicated processors, and can control other components in the image processing device 200 to perform desired functions.

The memory 220 may comprise one or more computer program products. The computer program products may comprise various forms of computer-readable storage media, such as volatile memory and/or non-volatile memory. The volatile memory may comprise, for example, a random access memory (RAM) and/or a cache or the like. The non-volatile memory may comprise, for example, a read only memory (ROM), a hard disk, a flash memory, and the like. One or more computer program instructions may be stored on the computer-readable storage medium and the processor 210 may execute the program instructions to implement the functions (implemented by the processor 210) and/or other desired functions in the embodiments of the present disclosure, such as the image processing method. Various application programs and various data, such as the start coordinates and end coordinates of respective rectangular regions, and various data used and/or generated by the application programs, and the like, may also be stored in the computer-readable storage medium.

It should be noted that, for clarity and conciseness, the embodiments of the present disclosure do not provide all the components of the image processing device 200. In order to achieve the necessary functions of the image processing device 200, those skilled in the art may provide and set other not-shown constituent units according to specific needs, and the embodiments of the present disclosure do not limit this.

For the technical effects of the image processing device 100 and the image processing device 200 in different embodiments, reference may be made to the technical effects of the image processing method provided in the embodiments of the present disclosure, and will not be repeated here.

Figure 12:
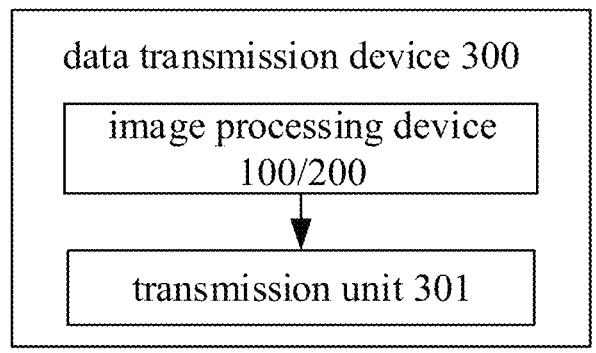
FIG. 12 is a schematic block diagram of a data transmission device provided by at least one embodiment of the present disclosure.

At least one embodiment of the present disclosure also provides a data transmission device. FIG. 12 is a schematic block diagram of a data transmission device according to at least one embodiment of the present disclosure. As shown in FIG. 12, the data transmission device 300 includes a transmission unit 301 and an image processing device 100/200 provided by any embodiment of the present disclosure.

For example, the image processing device 100/200 may be the image processing device 100 as shown in FIG. 10 or the image display processing device 200 as shown in FIG. 11, the embodiments of the present disclosure are not limited to this case.

For example, the image processing device 100/200 divides the image to determine N rectangular regions, which comprise only the first pixels, of the image, and obtains start coordinates and end coordinates of the N rectangular regions, respectively, thereby obtaining compressed data after compressing the image.

The transmission unit 301 is configured to frame and transmit the start coordinates and the end coordinates of the N rectangular regions. For example, the transmission unit 301 may implement step S220, and for a specific implementation method, reference may be made to the relevant description of step S220, and details are not described herein again.

For example, these components are interconnected by a bus system and/or other forms of coupling mechanisms (not shown). For example, the bus system may be a commonly used serial or parallel communication bus, etc., and the embodiments of the present disclosure do not limit this. It should be noted that the components and structure of the data transmission device 300 shown in FIG. 12 are only exemplary and not limitative, and the data transmission device 300 may have other components and structures as needed, for example, the data transmission device 300 may perform data transmission through various appropriate data transmission protocols and data transmission means (e.g., wired, wireless, etc.).

For the technical effect of the data transmission device 300 provided by some embodiments of the present disclosure, reference may be made to the corresponding description of the image processing method in the foregoing embodiments, and details are not described herein again.

Figure 13:
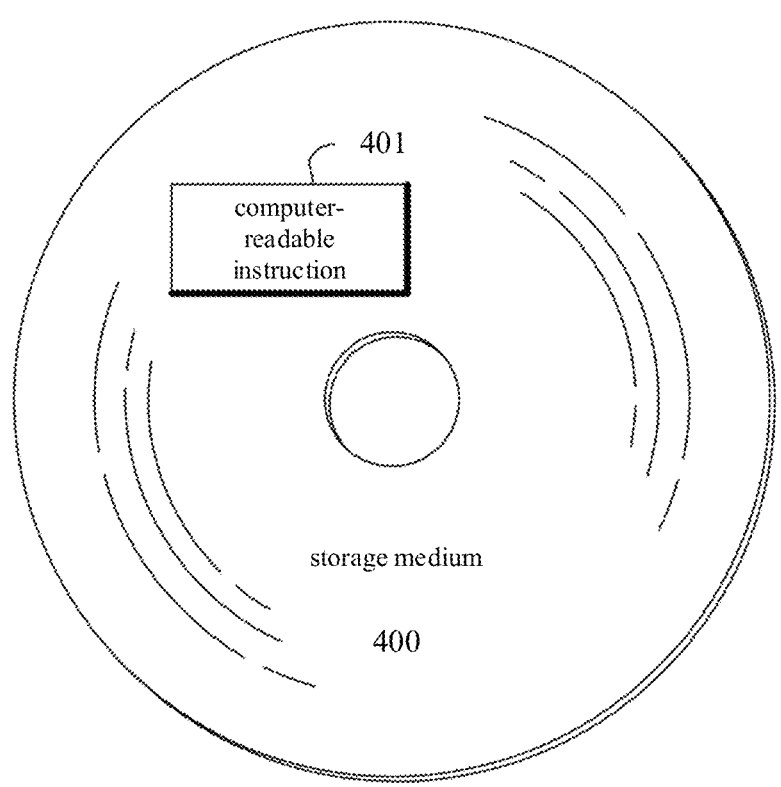
FIG. 13 is a schematic diagram of a storage medium provided by at least one embodiment of the present disclosure.

Some embodiments of the present disclosure also provide a storage medium. FIG. 13 is a schematic diagram of a storage medium provided by at least one embodiment of the present disclosure. For example, the storage medium 400 non-temporarily stores non-transitory computer-readable instructions 401. In the case where the non-transitory computer-readable instructions 401 are executed by a computer (including a processor), the image processing method or the data transmission method provided by any embodiment of the present disclosure may be performed by the computer.

For example, the storage medium may be any combination of one or more computer-readable storage media, for example, one computer-readable storage medium comprises computer-readable program codes for determining N rectangular region, and another computer-readable storage medium comprises computer-readable program codes for framing transmission. For example, in the case where the program codes are read by a computer, the computer may execute the program codes stored in the computer storage medium to perform, for example, the image processing method or the data transmission method provided by any embodiment of the present disclosure.

For example, the storage medium may include a memory card of a smartphone, a storage part of a tablet computer, a hard disk of a personal computer, a random access memory (RAM), a read only memory (ROM), an erasable programmable read only memory (EPROM), a portable compact disk read-only memory (CD-ROM), a flash memory, or any combination of the above storage media, and may also be other suitable storage media.

For the technical effects of the storage medium provided by the embodiments of the present disclosure, reference may be made to the corresponding description about the image processing method in the foregoing embodiments, and details are not described herein again.

The following points need to be explained:

(1) the accompanying drawings of the embodiments of the present disclosure involve only the structure(s) in connection with the embodiment(s) of the present disclosure, and other structure(s) can refer to in common design(s); and (2) in case of no conflict, the embodiments of the present disclosure and the features in the embodiment(s) can be combined with each other to obtain new embodiment(s).

What have been described above are only exemplary implementations of the present disclosure and is not intended to limit the protection scope of the present disclosure, and the protection scope of the present disclosure should be based on the protection scope of the appended claims.

What is claimed is:

1. An image processing method for an image, the image being a binarized image, and the binarized image comprising a plurality of pixels, wherein among the plurality of pixels, pixels having a first value are first pixels, and pixels having a second value are second pixels, and the image processing method comprises:

dividing the image to determine N rectangular regions, which comprise only the first pixels, of the image; and obtaining start coordinates and end coordinates of the N rectangular regions, respectively, thereby obtaining compressed data after compressing the image, wherein N is an integer greater than or equal to one;

the first pixels comprise a plurality of third pixels, and the third pixels are first pixels in an undetermined rectangular region needed to search for the third pixel to determine the rectangular region, dividing the image to determine the N rectangular regions, which comprise only the first pixels, of the image, comprises:

in a process of dividing the image, a rectangular region determined each time being a largest rectangular region comprising the third pixels;

wherein the first pixels further comprise a plurality of fourth pixels, and the fourth pixels are first pixels in a determined rectangular region; and dividing the image to determine an n-th rectangular region of the N rectangular regions, which comprise only the first pixels, of the image, comprises:

searching for the third pixels in the image;

performing a first scan along a first scan direction starting from a third pixel that is first searched until reaching a second pixel, a fourth pixel, or a boundary of the image, thereby obtaining an intermediate block region; and based on the intermediate block region, performing a second scan along a second scan direction that is different from the first scan direction to expand the intermediate block region until reaching the second pixel, the fourth pixel, or the boundary of the image, so as to obtain the n-th rectangular region of the image, wherein n is an integer greater than or equal to one and less than or equal to N; and wherein a scan region generated through the first scan is a square region with the third pixel that is first searched as a vertex, and the first scan direction is a diagonal direction starting from the third pixel that is first searched in the square region, and the second scan direction is the row direction or the column direction of the pixel array.

2. The image processing method according to claim 1, wherein the square region is expanded until either side of the square region reaches the second pixel, the fourth pixel, or the boundary of the image to determine the intermediate block region.

3. The image processing method according to claim 1, wherein the second scan is a point scan method or a line-segment scan method.

4. The image processing method according to claim 1, further comprising:
performing the first scan along the first scan direction starting from the third pixel that is first searched, in a case of reaching the second pixel and/or the fourth pixel, determining a direction judgment region, wherein the direction judgment region is a scan region obtained by expanding the intermediate block region along the diagonal direction by one pixel row and one pixel column;
judging whether an amount of second pixels and/or fourth pixels on the one pixel row, which is expanded, of the direction judgment region is greater than, less than, or equal to an amount of second pixels and/or fourth pixels on the one pixel column, which is expanded, of the direction judgment region,
if the amount of second pixels and/or fourth pixels on the one pixel row, which is expanded, of the direction judgment region is greater than the amount of second pixels and/or fourth pixels on the one pixel column, which is expanded, of the direction judgment region, determining that the second scan direction is the row direction;
if the amount of second pixels and/or fourth pixels on the one pixel row, which is expanded, of the direction judgment region is less than the amount of second pixels and/or fourth pixels on the one pixel column, which is expanded, of the direction judgment region, determining that the second scan direction is the column direction; and
if the amount of second pixels and/or fourth pixels on the one pixel row, which is expanded, of the direction judgment region is equal to the amount of second pixels and/or fourth pixels on the one pixel column, which is expanded, of the direction judgment region, determining that the second scan direction is the row direction or the column direction or stopping scanning.

5. The image processing method according to claim 1, further comprising: after determining the n-th rectangular region, scanning the image row by row or column by column starting from an origin of the binarized image or a starting first pixel of the n-th rectangular region to determine a next third pixel, thereby determining an (n+1)-th rectangular region among the N rectangular regions.

6. A data transmission method, comprising:
determining the N rectangular regions of the image and the start coordinates and the end coordinates of the N rectangular regions according to the image processing method according to claim 1; and
framing and transmitting the start coordinates and the end coordinates of the N rectangular regions wherein N is an integer greater than or equal to one.

7. The data transmission method according to claim 6, wherein framing and transmitting the start coordinates and the end coordinates of the N rectangular regions, comprises:
obtaining types of the N rectangular regions, respectively; and
according to the types of the N rectangular regions, framing and transmitting the start coordinates and the end coordinates of rectangular regions of respective types, respectively.

8. The data transmission method according to claim 6, wherein the types of the N rectangular regions comprise a single-point block format, a strip-type format with a width of one pixel, a square matrix format, and a strip-type format with a width of k pixels,
wherein k is an integer greater than one.

9. The data transmission method according to claim 6, wherein the end coordinates represent a scan direction and a length,
wherein the length is a difference between a start coordinate and an end coordinate in the row direction and/or column direction.

10. The data transmission method according to claim 6, wherein framing and transmitting the start coordinates and the end coordinates of the N rectangular regions, comprises:
compressing the start coordinates and the end coordinates into bytes and transmitting the bytes.

11. The data transmission method according to claim 6, further comprising:
receiving a color image;
performing grayscale processing on the color image to obtain a grayscale image and performing binarization processing on the grayscale image to obtain the binarized image.

12. The data transmission method according to claim 6, further comprising:
by a receiving terminal, receiving the start coordinates and the end coordinates of the N rectangular regions of the image, and decompressing the start coordinates and the end coordinates of the N rectangular regions of the image to restore to the binarized image, which is the image comprising the N rectangular regions.

13. An image processing device for an image, the image being a binarized image, and the binarized image comprising a plurality of pixels, wherein among the plurality of pixels, pixels having a first value are first pixels, and pixels having a second value are second pixels, and the image processing device comprises:
a division unit, configured to divide the image to determine N rectangular regions, which comprise only the first pixels, of the image; and
a compression unit, configured to obtain start coordinates and end coordinates of the N rectangular regions, respectively, thereby obtaining compressed data after compressing the image,
wherein N is an integer greater than or equal to one;
wherein the first pixels comprise a plurality of third pixels, and the third pixels are first pixels in an undetermined rectangular region;
the division unit is further configured to:
in a process of dividing the image, a rectangular region determined each time being a largest rectangular region comprising the third pixels;
wherein the first pixels further comprise a plurality of fourth pixels, and the fourth pixels are first pixels in a determined rectangular region; and
dividing the image to determine an n-th rectangular region of the N rectangular regions, which comprise only the first pixels, of the image, comprises:
searching for the third pixels in the image;
performing a first scan along a first scan direction starting from a third pixel that is first searched until reaching a second pixel, a fourth pixel, or a boundary of the image, thereby obtaining an intermediate block region; and
based on the intermediate block region, performing a second scan along a second scan direction that is different from the first scan direction to expand the intermediate block region until reaching the second pixel, the fourth pixel, or the boundary of the image, so as to obtain the n-th rectangular region of the image, wherein n is an integer greater than or equal to one and less than or equal to N;

wherein a scan region generated through the first scan is a square region with the third pixel that is first searched as a vertex, and the first scan direction is a diagonal direction starting from the third pixel that is first searched in the square region, and the second scan direction is the row direction or the column direction of the pixel array.

14. An image processing device for an image, comprising:

a processor;

a memory, storing one or more computer program modules, wherein the one or more computer program modules are configured to be executed by the processor, and the one or more computer program modules comprise instructions for performing the image processing method for an image:

the image is a binarized image, and the binarized image comprises a plurality of pixels, wherein among the plurality of pixels, pixels having a first value are first pixels, and pixels having a second value are second pixels, and the image processing method comprises:

dividing the image to determine N rectangular regions, which comprise only the first pixels, of the image; and obtaining start coordinates and end coordinates of the N rectangular regions, respectively, thereby obtaining compressed data after compressing the image, wherein N is an integer greater than or equal to one;

the first pixels comprise a plurality of third pixels, and the third pixels are first pixels in an undetermined rectangular region, dividing the image to determine the N rectangular regions, which comprise only the first pixels, of the image, comprises:

in a process of dividing the image, a rectangular region determined each time being a largest rectangular region comprising the third pixels;

wherein the first pixels further comprise a plurality of fourth pixels, and the fourth pixels are first pixels in a determined rectangular region; and dividing the image to determine an n-th rectangular region of the N rectangular regions, which comprise only the first pixels, of the image, comprises:

searching for the third pixels in the image;

performing a first scan along a first scan direction starting from a third pixel that is first searched until reaching a second pixel, a fourth pixel, or a boundary of the image, thereby obtaining an intermediate block region; and based on the intermediate block region, performing a second scan along a second scan direction that is different from the first scan direction to expand the intermediate block region until reaching the second pixel, the fourth pixel, or the boundary of the image, so as to obtain the n-th rectangular region of the image, wherein n is an integer greater than or equal to one and less than or equal to N;

wherein a scan region generated through the first scan is a square region with the third pixel that is first searched as a vertex, and the first scan direction is a diagonal direction starting from the third pixel that is first searched in the square region, and the second scan direction is the row direction or the column direction of the pixel array.

15. A data transmission device, comprising the image processing device according to claim 13 and a transmission unit, wherein the transmission unit is configured to frame and transmit the start coordinates and the end coordinates of the N rectangular regions.

16. A non-transitory storage medium with computer-readable instructions stored thereon executed by a computer to perform the image processing method according to claim 1.

* * * * *